US011115613B2

(12) United States Patent
Doege

(10) Patent No.: US 11,115,613 B2
(45) Date of Patent: Sep. 7, 2021

(54) READOUT ARRANGEMENT FOR AN IMAGE SENSOR, IMAGE SENSOR SYSTEM AND METHOD FOR READING OUT AN IMAGE SENSOR

(71) Applicant: Fraunhofer-Gesellschaft zur Foerderung der angewandten Forschung e.V., Munich (DE)

(72) Inventor: Jens Doege, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/515,418

(22) Filed: Jul. 18, 2019

(65) Prior Publication Data
US 2019/0342513 A1 Nov. 7, 2019

Related U.S. Application Data

(63) Continuation of application No. PCT/EP2018/051231, filed on Jan. 18, 2018.

(30) Foreign Application Priority Data

Jan. 18, 2017 (EP) .................................. 17152077
Jan. 19, 2017 (EP) .................................. 17152299

(51) Int. Cl.
*H04N 5/378* (2011.01)
(52) U.S. Cl.
CPC .................................. *H04N 5/378* (2013.01)
(58) Field of Classification Search
CPC .............................. H04N 5/378; H04N 5/3456
See application file for complete search history.

(56) References Cited

U.S. PATENT DOCUMENTS 5,909,026 A   6/1999  Zhou et al.
9,635,325 B2  4/2017  Borthakur
              (Continued)

FOREIGN PATENT DOCUMENTS

CN   205647747 U    10/2016
JP   2003169251 A    6/2003
              (Continued)

OTHER PUBLICATIONS

Doege, Jens, et al., "A 1 Megapixel HDR Image Sensor SoC with Highly Parallel Mixed-Signal Processing", Jens Döge, Christoph Hoppe, Peter Reichel, Nico Peter, A 1 Megapixel HDR Image Sensor SoC with Highly Parallel Mixed-Signal Processing. International Image Sensor Workshop (IISW), 2015., 2015, 3 pages.

(Continued)

Primary Examiner — Yogesh K Aggarwal
(74) Attorney, Agent, or Firm — Michael A. Glenn; Perkins Coie LLP

(57) ABSTRACT

A readout arrangement for an image sensor is configured to receive from a plurality of column leads of the image sensor in parallel a plurality of image sensor analog signals describing in an analog manner brightness values detected by the image sensor. The readout arrangement is configured to select which subset of a plurality of analog values represented by the image sensor analog signals or based on the image sensor analog signals is to be stored in an analog memory for further processing, and to cause storage of the selected analog values in the analog memory, or to store the selected analog values in the analog memory.

29 Claims, 14 Drawing Sheets

(56) References Cited

U.S. PATENT DOCUMENTS

| | | | |
|---|---|---|---|
| 2003/0052252 A1 | 3/2003 | Sugiyama et al. | |
| 2014/0285625 A1 | 9/2014 | McGarry | |
| 2015/0070555 A1* | 3/2015 | Guicquero | H04N 5/3745 |
| | | | 348/308 |
| 2015/0163401 A1 | 6/2015 | Botts et al. | |
| 2015/0379740 A1* | 12/2015 | Yang | G06T 5/50 |
| | | | 348/222.1 |
| 2016/0092735 A1 | 3/2016 | Govil et al. | |
| 2016/0094800 A1 | 3/2016 | Gousev et al. | |

FOREIGN PATENT DOCUMENTS

| | | |
|---|---|---|
| JP | 2014209103 A | 11/2014 |
| JP | 2016541191 A | 12/2016 |
| JP | 2017533640 A | 11/2017 |

OTHER PUBLICATIONS

Lindgren, Leif, et al., "A Multiresolution 100-GOPS 4-Gpixels/s Programmable Smart Vision Sensor for Multisense Imaging", Leif Lindgren, Johan Melander, Robert Johansson, B Moller, A multiresolution 100-GOPS 4-Gpixels/s programmable smart vision sensor for multisense imaging. Solid-State Circuits, IEEE Journal of, 40(6)1350-1359, 2005., Jun. 6, 2005, 10 pages.

* cited by examiner architecture of the "Vision-SoC" with analog memory matrix analog data path memory multiplexer

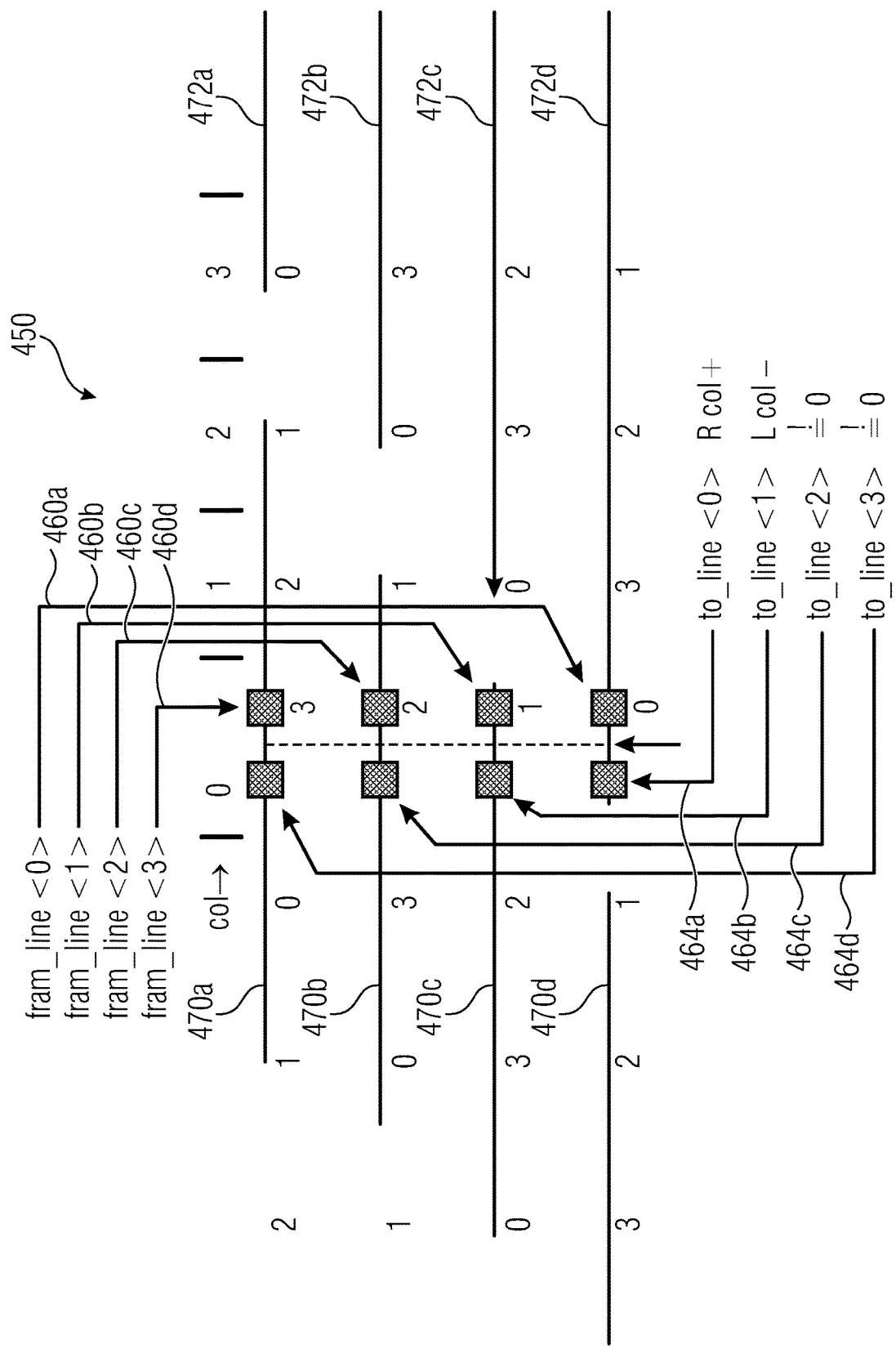

pixel cell with global shutter – example memory cell

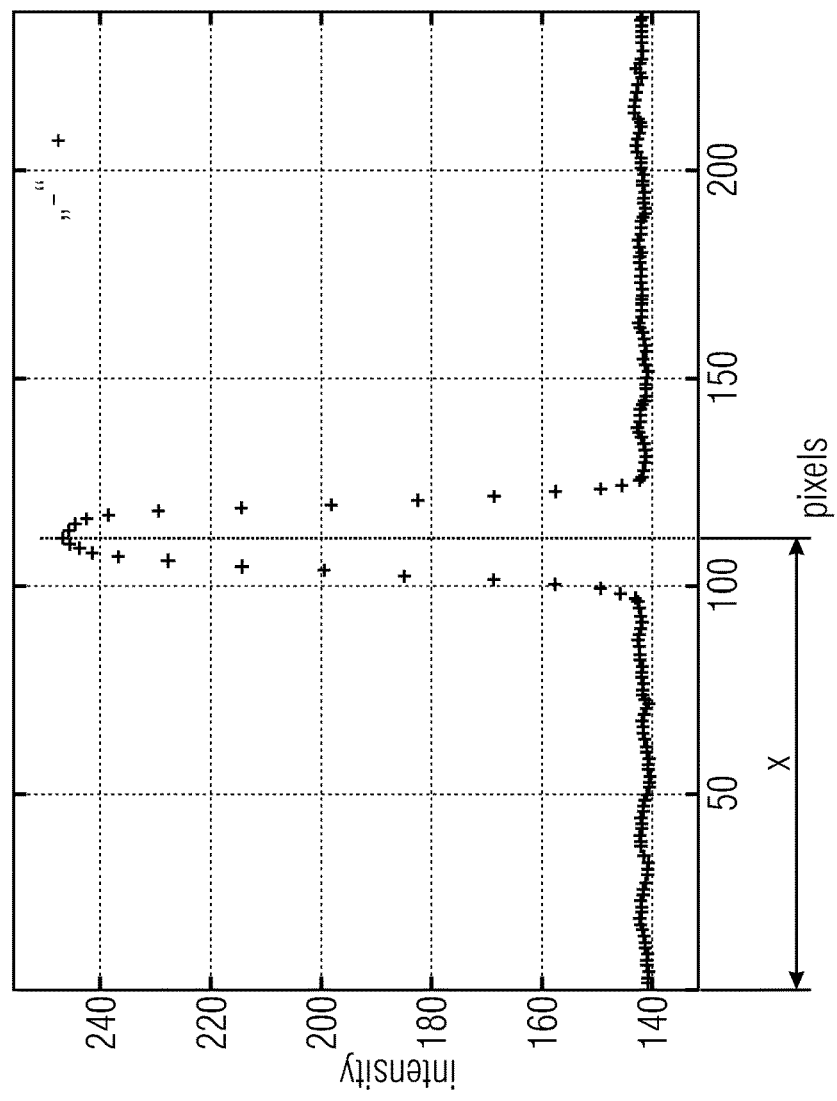
Fig. 7a
Fig. 7b
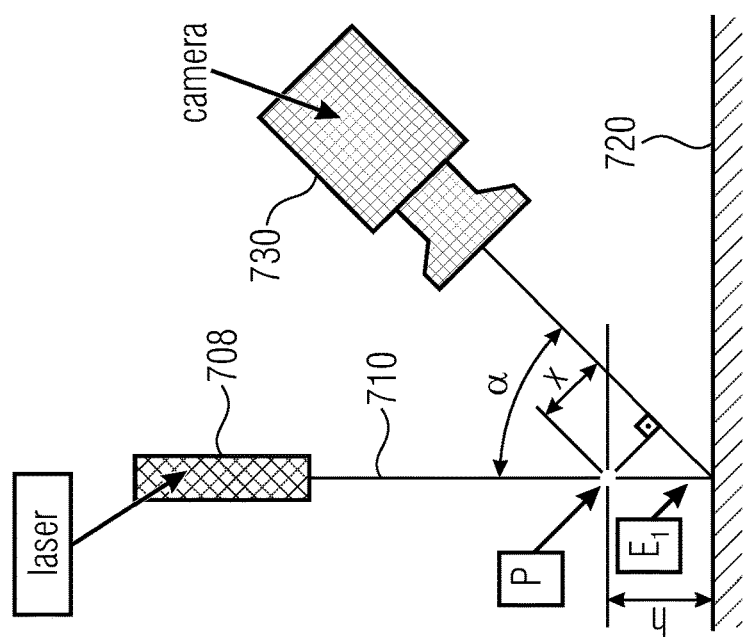
sheet of light arrangement (a)
and course of the grey value along a sensor column (b)

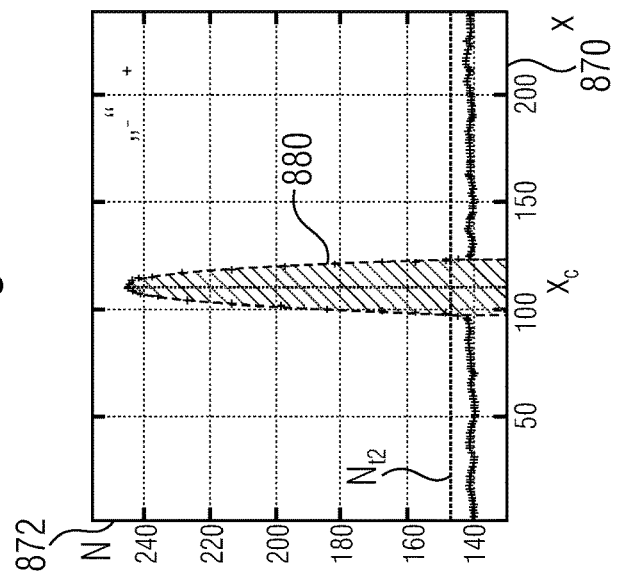
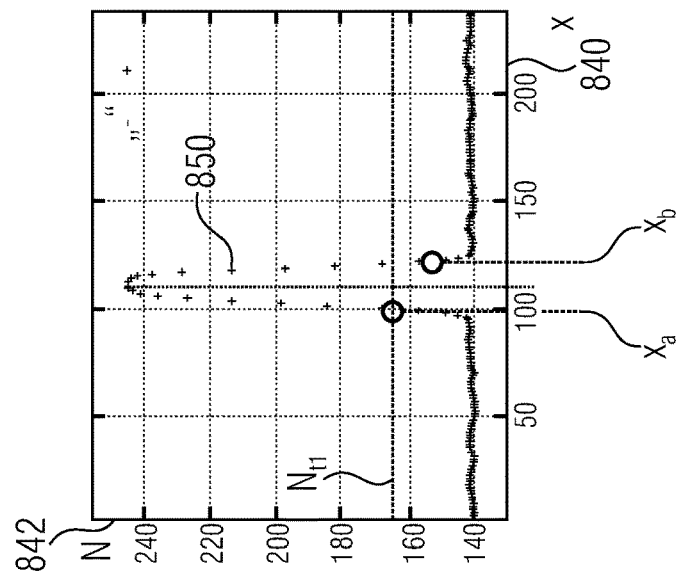
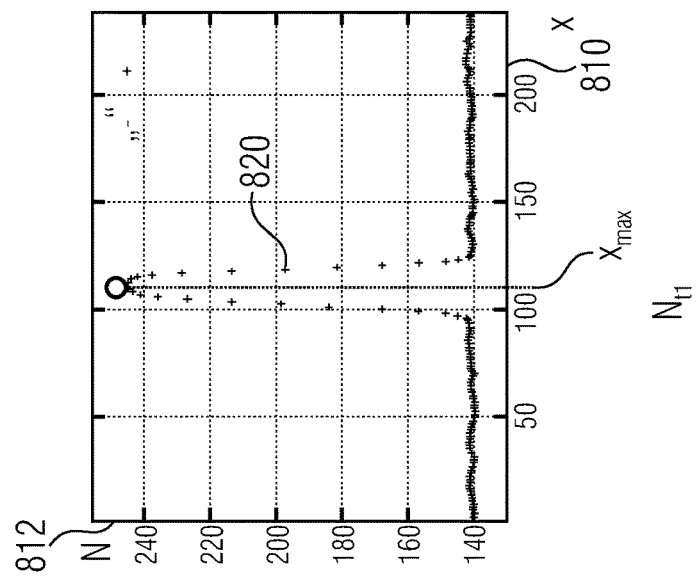
different variations for determining the $x_0$ of the grey value along a sensor column

READOUT ARRANGEMENT FOR AN IMAGE SENSOR, IMAGE SENSOR SYSTEM AND METHOD FOR READING OUT AN IMAGE SENSOR

CROSS-REFERENCES TO RELATED APPLICATIONS

This application is a continuation of copending International Application No PCT/EP2018/051231, filed Jan. 18, 2018, which is incorporated herein by reference in its entirety, and additionally claims priority from European Applications Nos. EP 17 152 077.8, filed Jan. 18, 2017 and EP 17 152 299.8, filed Jan. 19, 2017, all of which are incorporated herein by reference in their entirety.

BACKGROUND OF THE INVENTION

Embodiments according to the invention refer to a readout arrangement for an image sensor.

Further embodiments according to the invention refer to an image sensor system.

Further embodiments according to the invention refer to a method for reading out an image sensor.

Embodiments according to the invention refer to an architecture for compressing the image sensors to be read out.

Capturing images with the help of image sensors is useful in many applications. In particular, it is desirable in these cases to further process the image data gained by the image sensors in order to obtain information about an image content.

Image sensors with pixel-parallel (or image point-parallel) signal processing in a sensor matrix provide intermediate results and final results that are then transmitted to a next processing unit or to an output interface. If a large amount of data is generated, the bandwidth may be too small and the results may not be retrievable.

For pixel-parallel, or image point-parallel, architectures with a strong local compression of the data, concepts such as the event-driven readout based on an address ("address-event representation", AER) have been developed. Image processing is performed in the pixel cells, or image point cells, which, upon reaching predefined results, transfers the location of the occurrence to the edge of the sensor matrix. An external logic registers this on the basis of the address and performs a sequential readout of the results. At very high event rates, the readout is relatively inefficient or events may even be lost.

Due to the very high complexity of the pixel cells, or image point cells, used for this purpose as well as due to the associated unfavorable optical properties such as
  a low resolution or
  a low filling factor
special image sensor systems-on-chip ("SoC") using column-parallel image processing were developed for certain applications such as sheet of light, (e.g., see references [2] and [1]).

It has been found that only such architectures having relatively simple pixel cells, or image point cells, and a complex processing logic for processing different signal types (also referred to as "mixed-signal processing logic") outside the image field enable a very high image processing speed (e.g., sheet of light with a profile rate of 100 kHz) in combination with a pixel pitch, or image point pitch, similar to that in industrial image sensors (e.g., a 8.75 μm in source [1]).

In view of the above, there is a need for a concept enabling efficient evaluation of image sensor data.

SUMMARY

An embodiment may have a readout arrangement for an image sensor, wherein the readout arrangement is configured to receive from a plurality of column leads of the image sensor in parallel a plurality of image sensor analog signals describing in an analog manner brightness values detected by the image sensor, and wherein the readout arrangement is configured to select which subset of a plurality of analog values represented by the image sensor analog signals or based on the image sensor analog signals is to be stored in an analog memory for further processing, and to cause storage of the selected analog values in the analog memory, or to store the selected analog values in the analog memory; wherein the readout arrangement is configured to, based on an evaluation of the image sensor analog signals, decide which subset of a plurality of analog values represented by the image sensor analog signals or based on the image sensor analog signals is to be stored in an analog memory for further processing.

According to another embodiment, an image sensor system may have an image sensor; an inventive readout arrangement; and an analog-to-digital converter; and a digital processor; wherein the analog-to-digital converter is configured to digitize analog values stored in the analog memory or analog values derived therefrom, and wherein the digital processer is configured to analyze image information based on digital signals provided by the analog-to-digital converter.

Another embodiment may have a method for reading out an image sensor, wherein the method includes parallelly receiving from a plurality of column leads of the image sensor a plurality of image sensor analog signals describing in an analog manner brightness values detected by the image sensor, and wherein the method includes selecting which subset of a plurality of analog values represented by the image sensor analog signals or based on the image sensor analog signals is stored in an analog memory for further processing, wherein, based on an evaluation of the image sensor analog signals, it is decided which subset of a plurality of analog values represented by the image sensor analog signals or based on the image sensor analog signals is to be stored in an analog memory for further processing; and wherein the method includes storing the selected analog values in the analog memory.

Another embodiment may have a readout arrangement for an image sensor, wherein the readout arrangement is configured to receive from a plurality of column leads of the image sensor in parallel a plurality of image sensor analog signals describing in an analog manner brightness values detected by the image sensor, and wherein the readout arrangement is configured to vary an assignment between an image column and columns of an analog memory in which analog values belonging to the image column are stored so that analog values belonging to an image column are stored in different memory columns of the analog memory, and such that analog values describing a line running diagonally across the image sensor are stored in a rectangular memory region of the analog memory.

An embodiment according to the invention provides a readout arrangement for an image sensor. The readout arrangement is configured to receive from a plurality of column leads of the image sensor in parallel a plurality of image sensor analog signals analogously describing brightness values detected by the image sensor. The readout arrangement is further configured to select which subset of a plurality of analog values represented by the image sensor analog signals or based on the image sensor analog signals is to be stored in an analog memory for further processing, and to cause storage of the selected analog values in the analog memory, or to store the selected analog values in the analog memory.

This readout arrangement is based on the finding that a preselection of analog values represented by image sensor analog signals, or derived from the image sensor analog signals (typically through an advantageously quick analog signal processing), and a storage of these analog values in an analog memory results in a reduction in the amount of data having to be digitally processed (e.g., following a high-resolution analog-to-digital conversion). Therefore, a reduction of the amount of data already takes place at the level of the analog values so that it is no longer necessary to convert analog values from all pixels of the image sensor into digital signals in an elaborate manner. Therefore, the effort involved in the analog-to-digital conversion of image sensor analog signals is reduced. In addition, the amount of data of image sensor information to be digitally transmitted may also be significantly reduced which significantly increases the performance of a system including an image sensor and the readout arrangement, or significantly reduces an involved data rate. By storing selected analog values (i.e., not all analog values of all image points of the image sensor) in an appropriately organized analog memory, it is possible, e.g., to access the analog values quickly and efficiently. In addition, with appropriate storage of the analog values into the analog memory, a certain sorting of the analog values may be carried out so that, e.g., analog values to be processed together after an analog-to-digital conversion may be stored in a connected region of the analog memory. For example, this may simplify the access and may decrease or avoid the additional effort needed to re-sort digitized values.

In addition, by appropriately selecting the analog values to be stored in the analog memory, an amount of data may be significantly reduced, e.g., by only storing analog values in the analog memory that are classified due to fast analog preprocessing as being relevant for later digital evaluation.

In summary, it may be stated that the readout arrangement for processing image sensor output signals described herein may simplify the use at high frame rates and may also be implemented without significantly impairing the properties of an image sensor (e.g., a filling factor).

In the following, further optional aspects of embodiments are described according to the present invention. The aspects described in the following may be combined individually or together with the readout arrangement described above, for example.

In an embodiment, for example, the readout arrangement may comprise a column-parallel processing unit. For example, the readout arrangement may be configured to, based on an evaluation of the image sensor analog signals, decide which subset of a plurality of analog values represented by the image sensor analog signals or based on the image sensor analog signals is to be stored in an analog memory for further processing. For example, such analog values (or only those) represented by the image sensor analog signals or based on the image sensor analog signals which are classified by the readout arrangement as being relevant for further processing (e.g., for determining a position of lines) may be stored in the analog memory for further processing. Therefore, it may be quickly decided by the evaluation means, e.g., by fast analog preprocessing (e.g., by a threshold value comparison of an analog value and a threshold value, or by a difference formation between two analog values and a subsequent comparison of the difference and a threshold value) which analog values (or which image sensor analog signals) are to be determined as being relevant. For example, only analog values classified in the readout arrangement as being relevant may be stored in the analog memory for further processing (in the longer term). Therefore, the analog memory capacity available is used appropriately.

In particular, it has been found that an exact evaluation of analog values (based on image sensor analog signals) is often comparatively complex, but that a decision as to whether analog values are relevant or useful for further evaluation may often be made on the basis of simple criteria. By preselecting the analog values relevant for further processing already when deciding whether analog values are to be stored in the analog memory for further processing, the available analog memory may be used efficiently and, for example, an analog-to-digital conversion of analog values classified by the readout arrangement as being irrelevant may be avoided. In this respect, the effort involved in the analog-to-digital conversion and in transmitting the digital output signals generated after the analog-to-digital conversion is also reduced under certain circumstances.

In an embodiment, the readout arrangement is configured to detect if a course of an image sensor analog signal belonging to a respective image column comprises across a plurality of image rows a course that fulfils a preset condition. For example, a readout arrangement may be configured to, in response to detecting that a course of an image sensor analog signal belonging to a respective image column comprises across a plurality of image rows a course that fulfils a preset condition, cause the storage of analog values describing the course in the analog memory.

Thus, for example, the readout arrangement may decide in a column-individual manner which analog values are to be considered as being relevant. For example, this detection of relevant analog values may be carried out by analyzing in the course of an image sensor analog signal belonging to a respective image column across a plurality of image rows. If a course is determined that is characteristic for a light line or laser line, for example, analog values of a sequence of adjacent image rows of the same image column may be detected as being relevant analog values to be stored in the analog memory and may be treated accordingly.

In an embodiment, the readout arrangement may be configured to perform analog preprocessing of the image sensor analog signals to obtain preprocessed signals. Then, the readout arrangement may be configured to select analog values that are based on the image sensor analog signals and are represented by preprocessed signals for the storage in the analog memory. For example, an absolute-value formation or a difference formation between several analog values may be carried out. With this, particularly relevant information may be stored in the analog memory. Preprocessing may also serve to, or help to, detect relevant analog values, or to detect a characteristic course of the image sensor analog signals (e.g., across a plurality of adjacent image rows).

In an embodiment, the readout arrangement is configured to, in response to an image sensor analog signal or a signal based on an image sensor analog signal (e.g., by means of a comparison to an image sensor analog signal from a spatially adjacent image point, or by means of a comparison to an image sensor analog signal of the same image point at an earlier point in time) passing a preset threshold value in a first direction and/or in a second direction, decide that an analog value represented by the respective image sensor analog signal or based on the respective image sensor analog signal is to be stored in the analog memory for further processing. With this, the presence of relevant analog values therefore to be stored in the analog memory for processing may be detected efficiently.

In an embodiment, the readout arrangement may be configured to, when passing the preset threshold value (or in response to passing the present threshold value), additionally store digital information carrying information as to which image row of the image sensor is being read out when passing the preset threshold value was detected. In this respect, the additional digital information may provide information as to which image row (and/or which image column), or which image region, analog values stored in the analog memory are assigned to. This additional digital information may then be used in an evaluation of the analog values deposited in the analog memory. The additional detailed information is particularly helpful if only relevant sections of an image content (or analog values derived therefrom) are stored in the analog memory, rather than an entire image content, since this enables a conclusion as to which image rows or image columns or image regions the analog values stored in the analog memory originate from.

In a further embodiment, the readout arrangement may be configured to decide in a column-individual manner or separately for different columns or separately for different groups of column whether an analog value represented by an image sensor analog signal of a respective column lead or an analog value based on the image sensor analog signal of the respective column lead is to be stored in the analog memory for further processing (for example, so that, based on image sensor analog signals assigned to different image columns, analog values assigned to different row regions are stored in the analog memory). For example, by storing for each image column only the relevant analog values (e.g., the analog values of relevant image rows), the available analog memory may be efficiently used. For example, this is helpful if lines run diagonally across an image sensor so that they illuminate a first row region in the region of a first image column and illuminate a different second row region at a different second image column. For example, for the first image column, analog values of the first row region are then stored in the analog memory, and analog values of the second row region that differs from the first row region are then stored for the second image column in the analog memory.

In an embodiment, the readout arrangement may be configured to obtain and evaluate configuration information that separately determines for different columns from which image rows analog values represented by the image sensor analog signals or analog values based on the image sensor analog signals are to be stored in the analog memory for further processing. Thus, it may also be specified from the outside, e.g., by a higher-level controller, which analog values are to be stored in the analog memory. For example, this makes sense if a certain prior knowledge of the image regions of interest is already available.

In an embodiment, the readout arrangement may be configured to cause a storage of the analog values represented by the image sensor analog signals or based on the image sensor analog signals without prior checking as to whether the analog values are to be obtained for further processing. In this case, e.g., the readout arrangement may be configured to cause (e.g., by appropriate selection of a next writing address, e.g., equal to the current writing address) an (e.g., immediate or spontaneous) overwrite of the analog values stored without prior checking (e.g., by the analog values obtained from the image sensor in a next step) whether the readout arrangement determines that the analog value stored without prior checking is not to be stored for further processing (e.g., for the longer-term). In this way, a particularly fast operation of the analog memory is possible since storing, which is often comparatively time consuming, may be carried out immediately when the analog value is available. Thus, during the storing process, it may be decided whether the analog value that has been just now stored is to remain stored for further processing, or whether the corresponding analog value is to be overwritten after a short time (e.g., "immediately", i.e., if a new analog value is present, for example) without a readout of the analog value. Storing an analog value in the analog memory in connection with immediately overwriting the stored analog value (e.g., a soon as a next analog value is present) is not considered as storing the analog value for further processing. Rather, storing an analog value for further processing means storing the analog value for a longer period of time, so that the analog value is available for a later readout process. In other words, the selection of analog values for storing in the analog memory for further processing may be carried out by initially storing all analog values and by immediately overwriting such analog values that are not selected for storage for further processing, e.g., when the next analog value from the next image point is present. Thus, temporal operating sequences may be accelerated, or parallelized, and it may be taken into account that storing the analog value takes a comparatively long time.

In a further embodiment, the readout arrangement may store or cause to store successive analog values represented by the image sensor analog signals or based on the image sensor analog signals successively into an analog memory region (e.g., assigned to a respective column of the image sensor) driven or configured as a ring buffer. For example, this may be done in such a way that cyclic overwriting of analog values takes place in the region driven or configured as ring buffer. Thus, for example, it may be achieved that a certain number of analog values preceding a current analog value is stored, which in turn makes it possible that the analog values preceding a triggering event may also remain stored. For example, upon detection of a triggering event, it may be caused that previously stored analog values are no longer overwritten in the ring buffer or that at least some of the analog values stored in the ring buffer before the detection of the triggering even remain (for a readout). For example, if it is detected that an analog value based on an image sensor column signal of an i-th image row comprises a local maximum, e.g., analog values that are based on one or several image rows (e.g., immediately) preceding the i-th image row may remain (stored for a longer term) in the analog memory (for a readout), and analog values that are based on one or several image rows following the i-th image row may also be stored in the analog memory (for later processing) (e.g., such that analog signals from a region around the i-th image row are simultaneously stored in the analog memory). Thus, it is not absolutely necessary to immediately detect a triggering even if a first analog value to be stored, or to remain for further processing, is present.

Thus, in an embodiment, the readout arrangement may be configured to, in response to detecting that analog values stored in the ring buffer are to be stored for further processing (e.g., and are to be preserved beyond the time at which overwriting would occur), prevent overwriting (e.g., by aborting the writing of analog values based on the column lead concerned, or by using a new memory region as a new ring buffer).

In an embodiment, a detection that the analog values stored in the ring buffer are to be stored for further processing (e.g., beyond the period and time where overwriting would occur) is carried out based on a detection of a local or absolute maximum of a brightness value on the basis of an image sensor analog signal. Thus, for example, analog values that are located (e.g., in the row direction) around a location of a maximum brightness may be retained in the analog memory for further processing. With this, for example, in a downstream processing (e.g., which may be based on a digitized version of the analog values), a position of an image of a line on the image sensor may be determined with high accuracy, while, for example, analog values that are not in the neighborhood of a brightness maximum may be discarded to reduce an amount of data (e.g., by overwriting in the analog memory).

In a further embodiment, the output arrangement may be configured to, in response to detecting that analog values are to be stored for further processing, store a fixed number of analog values for further processing. Alternatively (or additionally), the readout arrangement may be configured to, in response to detecting that analog values are to be stored for further processing, store a variable number of analog values for further processing depending on the analog values. For example, storing a fixed number of analog values for further processing may be considered to be "storing with a fixed interval". For example, storing a variable number of analog values for further processing may be considered to be "storing with a dynamic interval". The solution described first has the advantage that memory allocation may be clearly defined. The second alternative offers greater flexibility and allows, e.g., adjusting the number of stored analog values to a width of an image of a light beam, or to other properties of an image course that triggered the storage of the analog values for the further processing.

In a further embodiment, the readout arrangement may be configured to selectively store analog values that fulfil a preset condition in the analog memory. For example, analog values describing a brightness value that is larger than a threshold value may be stored in the analog memory. Optionally, a hysteresis may be used for this. Here, for example, "storing with a dynamic interval" may be used. Thus, for example, only such analog values that are assigned to sufficiently relevant structures may be selectively stored in the analog memory. Thus, an image background may be suppressed and the number of the stored analog value may accordingly be kept low.

In a further embodiment, the readout arrangement may be configured to store information (e.g., in digital form) describing which subset of the plurality of analog values represented by the image sensor analog signals or based on the image sensor analog signals was stored in the analog memory for further processing. For example, the information may describe which image rows the analog values stored for further processing are assigned to. With this, the position of the image points which the image stored analog values are based upon may be considered during evaluation.

In a further embodiment, the readout arrangement may be configured to vary (e.g., by driving the image sensor to determine image rows or image columns to be read out, and/or by driving a multiplexer that determines in which memory cell of the analog memory an analog value is to be stored) an assignment between an image column and columns of the analog memory in which analog values belonging to the image column are to be stored.

Thus, for example, analog values belonging to one image column may be stored in different memory columns of the analog memory. With this, for example, analog values belonging to a line running diagonally across the image sensor may be stored in an (at least logically with regard to memory rows and memory columns) essentially rectangular region of the analog memory. With this, subsequent evaluation of the analog values stored in the analog memory is facilitated since it is typically easier to read out a rectangular region of the analog memory than to read out a region of the analog memory that is defined by diagonal limits. In addition, in this manner, the memory space available in the analog memory may also be used more efficiently since different adjacent rectangular regions in the analog memory may be assigned to the different line portions, for example.

In an embodiment, the readout arrangement may be configured to, when storing in the analog memory, rearrange analog values that are assigned to image points. For example, analog values of image points that are located at center points along a curved or angular line may be stored in a linear region of the analog memory, i.e., in a continuously addressed region or in an essentially rectangular region of the analog memory. In this way, a storage space requirement in the analog memory may be minimized, and further processing of the rearranged or shifted analog values may be performed in a particularly efficient manner.

In an embodiment, the readout arrangement is configured to store the analog values into the analog memory such that signals read out from the analog memory as well as the image sensor analog signals are compatible with respect to the signal level. In other words, a signal compatibility may be achieved between outputs of the memories and the pixels, for example.

In an embodiment, the readout arrangement is configured to perform analog arithmetic operations based on signals read out from the analog memory. Thus, for example, analog arithmetic operations may be performed solely on the memories.

In an embodiment, the readout arrangement is configured to perform analog arithmetic operations in which image sensor analog signals and signals read out from the analog memory are combined. Thus, for example, analog arithmetic operations may be performed with memory and sensor matrix.

An embodiment according to the invention creates an image sensor system. The image sensor system includes an image sensor, a readout arrangement as described herein and an analog-to-digital converter and digital processing means. For example, the analog-to-digital converter is configured to digitize analog values stored in the analog memory, and analog values derived therefrom. For example, the digital processing means is configured to, based on digital signals provided by the analog-to-digital converter, analyze image information. Thus, for example, efficient and fast analog preprocessing may be used to select which analog values are to be stored in the analog memory for subsequent analog-to-digital conversion and further digital processing. With this, the amount of data is reduced since the analog-to-digital converter does no longer have to digitize the analog values of all image points, for example, but rather only the analog values of the image points detected as being relevant and stored in the analog memory. This also reduces the amount of digital data that has to be transported from the analog-to-digital converter to the processing means, this digital data representing a bottleneck in some conventional image sensors systems. Overall, the image sensor system described herein enables a particularly advantageous division of the processing tasks, wherein a detection of relevant analog values is carried out very early on in the processing chain and before the analog-to-digital conversion, for example. The digital processing means may therefore be realized with comparatively low computing power. This results in significant cost advantages and simplifies the implementation.

In an embodiment, the analog-to-digital converter is configured to digitize the analog values (1150*b-d*, 1152*b-d*; 1260*b-d*, 1262*b-d*, 1264*b-d*) stored in the analog memory (130; 220; 920; 1148; 1248), or analog values derived therefrom, in a separate readout process downstream of a readout of the image sensor. Thus, for example, a downstream digitalization from analog memories may be performed in a separate readout process.

In an embodiment, the digital processing means is configured to, based on digital signals provided by the analog-to-digital converter, detect (e.g., with a sub-image point accuracy, or sub-pixel accuracy) a position of a line in an image detected by the image sensor. It has been found that, especially in the presence of lines in an image, only a comparatively small part of the image information is relevant. Therefore, a preselection of the relevant image information, e.g., before storing analog values in the analog memory, is very helpful since, e.g., a storage and/or an analog-to-digital conversion of non-relevant analog values may be avoided. For example, it is possible to only store in the analog memory analog values of such image points that belong to lines which, for example, comprise a certain minimum brightness or comprise a maximum distance to a brightness maximum. Such a preselection of analog values that are relevant for the further evaluation by means of the digital processing means may, for example, be carried out with comparatively little hardware effort. On the other hand, determining with a sub-image point accuracy a position of a line in an image detected by the image sensor may comprise a comparatively high effort. For this purpose, the digital processing means may, for example, evaluate the preselected analog values stored in the analog memory (after a corresponding analog-to-digital conversion) and perform one or several calculations based on the values obtained by means of the analog-to-digital conversion, for example. Thus, this creates a highly efficient system in which the digital processing means only has to process such digitized values that were previously classified by the readout arrangement as being relevant.

As a result, the position of a line may be determined with a high degree of accuracy, while the processing effort is kept comparatively low.

In an embodiment, the digital processing means is configured to evaluate information (e.g., in digital form) describing which subset of the plurality of analog values represented by the image sensor analog signals or based on the image sensor analog signals was stored in the analog memory for further processing. For example, the digital information may describe which image rows or which image regions the analog values stored in the analog memory belong to. In this respect, the information describing which subset of the analog values was stored in the analog memory for further processing may be used by the digital processing means to determine a position of the properties detected based on the stored analog values.

In a further embodiment, the image sensor system may be configured to determine for different columns of the image sensor a position of a light line (e.g., which is generated by means of a sheet of light of a three-dimensional object) along a respective column of the image sensor. In this respect, a position of a line running diagonally across an image sensor may also be determined with a high degree of accuracy, for example, wherein in each of the columns, for example, only analog values of such image points (or image rows) that actually belong to the line or are located in an area around the line are stored in the analog memory and are subsequently evaluated by means of the digital processing means. Thus, different row regions may be stored and evaluated in different columns.

In a further embodiment, the image sensor system may be configured to selectively store in the analog memory analog values that are present upon a significant change (e.g., a sign change) of an image sensor analog signal or a signal based on an image sensor analog signal (e.g., an analog signal based on a comparison to an image sensor analog signal from a spatially adjacent image point, or based on a comparison to an image sensor analog signal of the same image point at an earlier point in time). In this way, for example, changes of an image content resulting due to various effects may be analyzed. In particular, for example, only such analog values that characterize the changes may be stored in the analog memory for further processing, which in turn enables a particularly efficient evaluation (and analog-to-digital conversion).

In an embodiment, the image sensor system may be configured to, based on the selectively stored analog values, perform an evaluation of a white light interferometry. It has been found that with a white light interferometry, changes to an image sensor analog signal or a signal derived therefrom (e.g., changes that are greater than a specified threshold value) have special significance. In this respect, the image sensor system described enables a particularly efficient operation or evaluation of a white light interferometry.

A further embodiment according to the invention describes a method for reading out an image sensor. The method includes parallelly receiving (e.g., from a plurality of column leads of the image sensor) a plurality of image sensor analog signals describing in an analog form brightness values detected by the image sensor. The method further includes selecting which subset of a plurality of analog values represented by the image sensor analog signals or based on the image sensor analog signals is to be stored in an analog memory for further processing. The method further includes storing the selected analog values in the analog memory. The corresponding method is based on the same considerations as the above described apparatus. The method may optionally be supplemented by all features and functions of the readout arrangement and the image sensor system as described herein. In the method, these features may be used individually or in combination.

A further embodiment according to the invention creates a readout arrangement for an image sensor. The readout arrangement is configured to receive in parallel from a plurality of column leads of the image sensor a plurality of image sensor analog signals describing in analog form brightness values detected by the image sensor. For example, the readout arrangement is configured to vary (e.g., by means of driving the image sensor to determine rows to be read out and/or by driving a multiplexer that determines in which memory cell of the analog memory an analog value is to be stored) an assignment between an image column and columns of an analog memory in which analog values belonging to the image column are to be stored so that analog values belonging to an image column are stored in different memory columns of the analog memory. By means of the corresponding concept, for example, it may be made possible that analog values describing a line running diagonally across the image sensor are stored in a rectangular memory region of the analog memory and may therefore be evaluated and processed in an efficient manner. In addition, the storage of associated properties in a rectangular memory region of the analog memory is typically very memory-efficient since, for example, a comparatively small memory may store analog values belonging to different regions of interest. For example, even if lines run in different directions in the different regions of interest, rectangular memory regions of the analog memory that are easily manageable may still be used, which saves memory space and simplifies readout.

In a further embodiment, the readout arrangement is configured to, when storing in the analog memory, rearrange analog values assigned to the image points. Thus, for example, analog values of image points whose centers are located along a curved or angled line may be stored in a linear or rectangular region of the analog memory. For example, the image points, or the analog values assigned thereto, located along a curved or angled line may be stored in a continuously addressed region of the analog memory. This facilitates readout and further processing and is also memory efficient.

BRIEF DESCRIPTION OF THE DRAWINGS

Embodiments of the present invention will be detailed subsequently referring to the appended drawings, in which:

FIG. 4*b* shows a schematic illustration of a memory multiplexer according to an embodiment of the invention;

FIG. 7*a* shows a schematic illustration of a sheet of light arrangement;

FIG. 7*b* shows a schematic illustration of a course of a grey value along a sensor column;

FIGS. 8*a*-8*c* shows schematic illustrations of different variations for determining a coordinate $x_0$ of a grey value along a sensor column;

DETAILED DESCRIPTION OF THE INVENTION

1. Readout Arrangement According to FIG. 1

Figure 1:
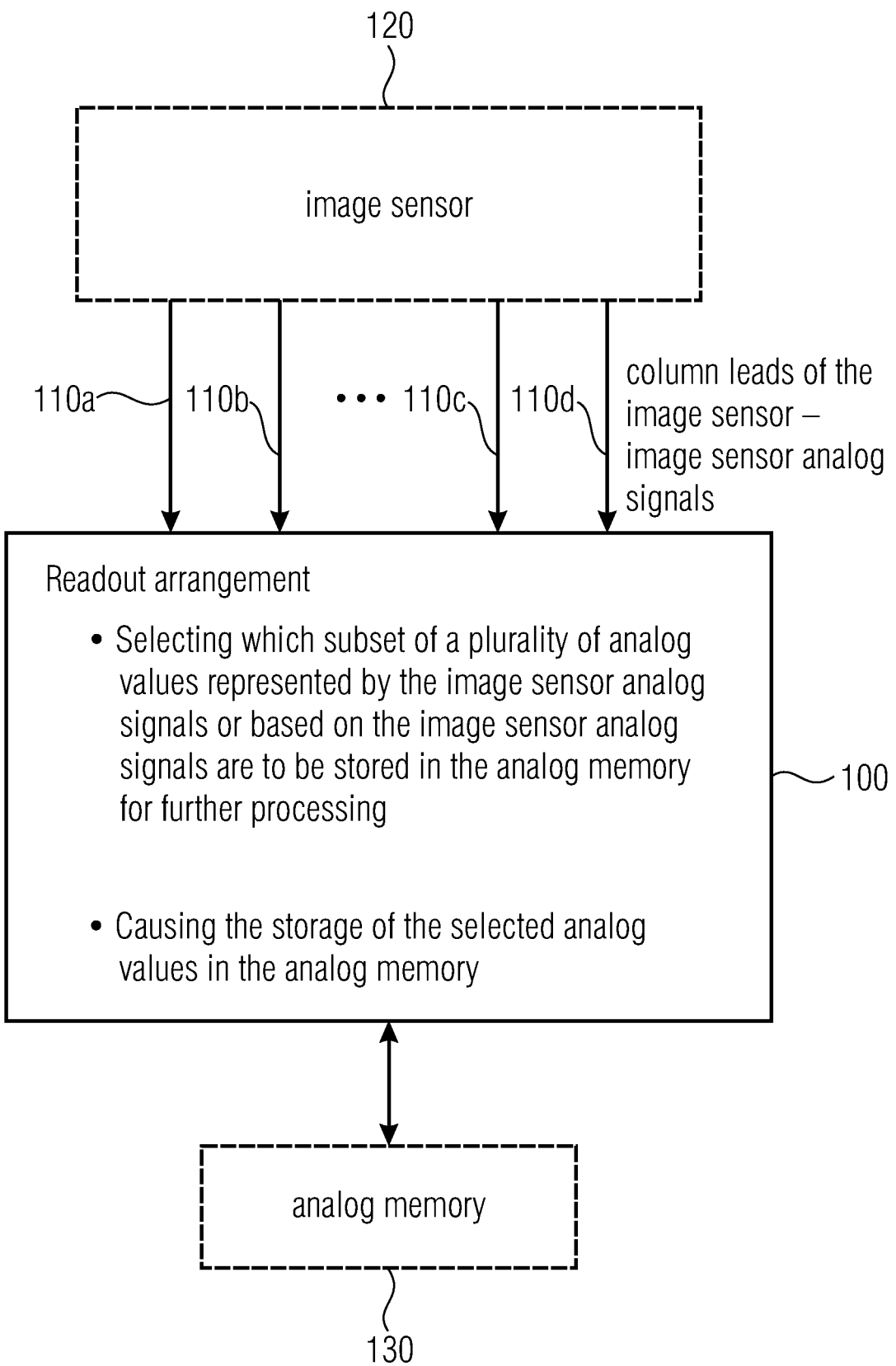
FIG. 1 shows a block circuit diagram of a readout arrangement according to an embodiment of the present invention.

FIG. 1 shows a schematic illustration of a readout arrangement 100 according to an embodiment of the present invention. For example, the readout arrangement 100 is configured to receive in parallel from a plurality of column leads of the image sensor 120 a plurality of image sensor analog signals 110*a* to 110*b* describing in analog form brightness values detected by an image sensor 120. The readout arrangement 100 is further configured to select which subset of a plurality of analog values represented by the image sensor analog signals 110*a* to 110*b* or based on the image sensor analog signals is to be stored in an analog memory 130 for further processing. The readout arrangement 100 is configured to cause the storage of the selected analog values in the analog memory 130 or to store the selected analog values in the analog memory 130. Thus, for example, the readout arrangement 100 provides an interface between the image sensor 120 and the analog memory 130. For example, the readout arrangement drives the analog memory 130 such that not all analog values output by the image sensor 120 are stored in the analog memory 130 for further processing. Rather, the readout arrangement 100 makes a selection as to which of the analog values are to be stored in the analog memory 130, and which of the analog values are either not stored in the analog memory 130, or are immediately overwritten (and are therefore not stored in the analog memory for further processing). For example, the readout arrangement 100 may use different criteria to decide as to which of the analog values are to be stored in the analog memory 130 for further processing. For example, the analog values may be based directly on the image sensor analog signals 110*a* to 110*b*, or the analog values stored in the analog memory 130 may be generated by analog preprocessing of the image sensor analog signals. For example, several image sensor analog signals may be combined (e.g., by absolute-value formation or difference formation), or values of the image sensor analog signals at different times may be combined, e.g., in the sense of a difference formation or in the sense of a determination of an amount of change across time. For example, the readout arrangement 100 may perform an essentially analog processing of the sensor analog signals in order to finally decide, e.g., based on a binary threshold decision, which analog values are to be stored in the analog memory 130.

It is to be noted that the readout arrangement 100 according to FIG. 1 may be supplemented by all features described herein. For example, the features of all functionalities as described in the following based on FIGS. 2 to 12 may be incorporated into the readout arrangement 100 individually or in combination.

2. Architecture According to FIGS. 2 to 6

Figure 2:
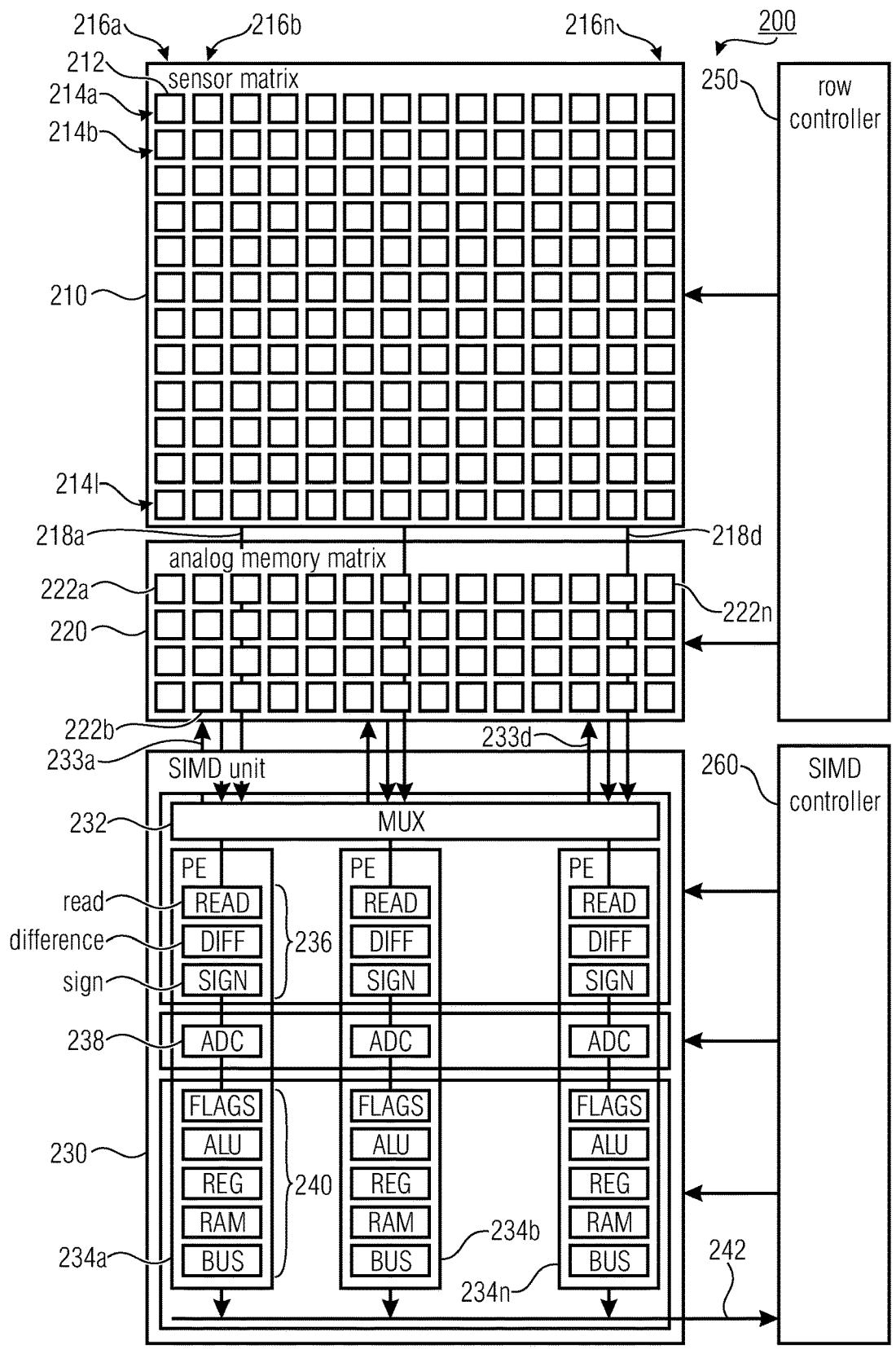
FIG. 2 shows a schematic illustration of an architecture of a "Vision SoC" (Vision System-on-Chip) with an analog memory matrix.
Figure 3:
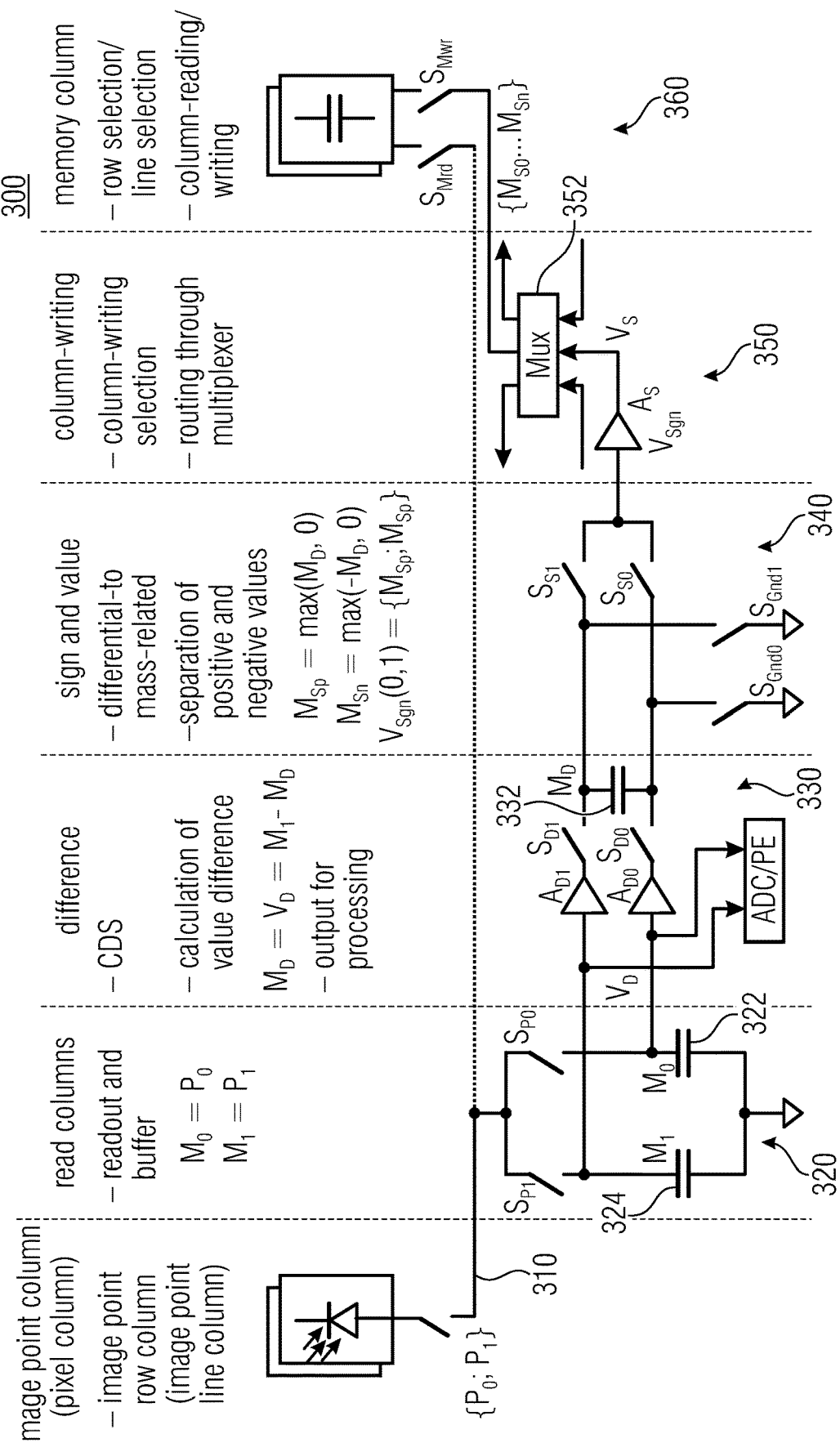
FIG. 3 shows a schematic illustration of an analog data path according to an embodiment of the present invention.
Figure 4A:
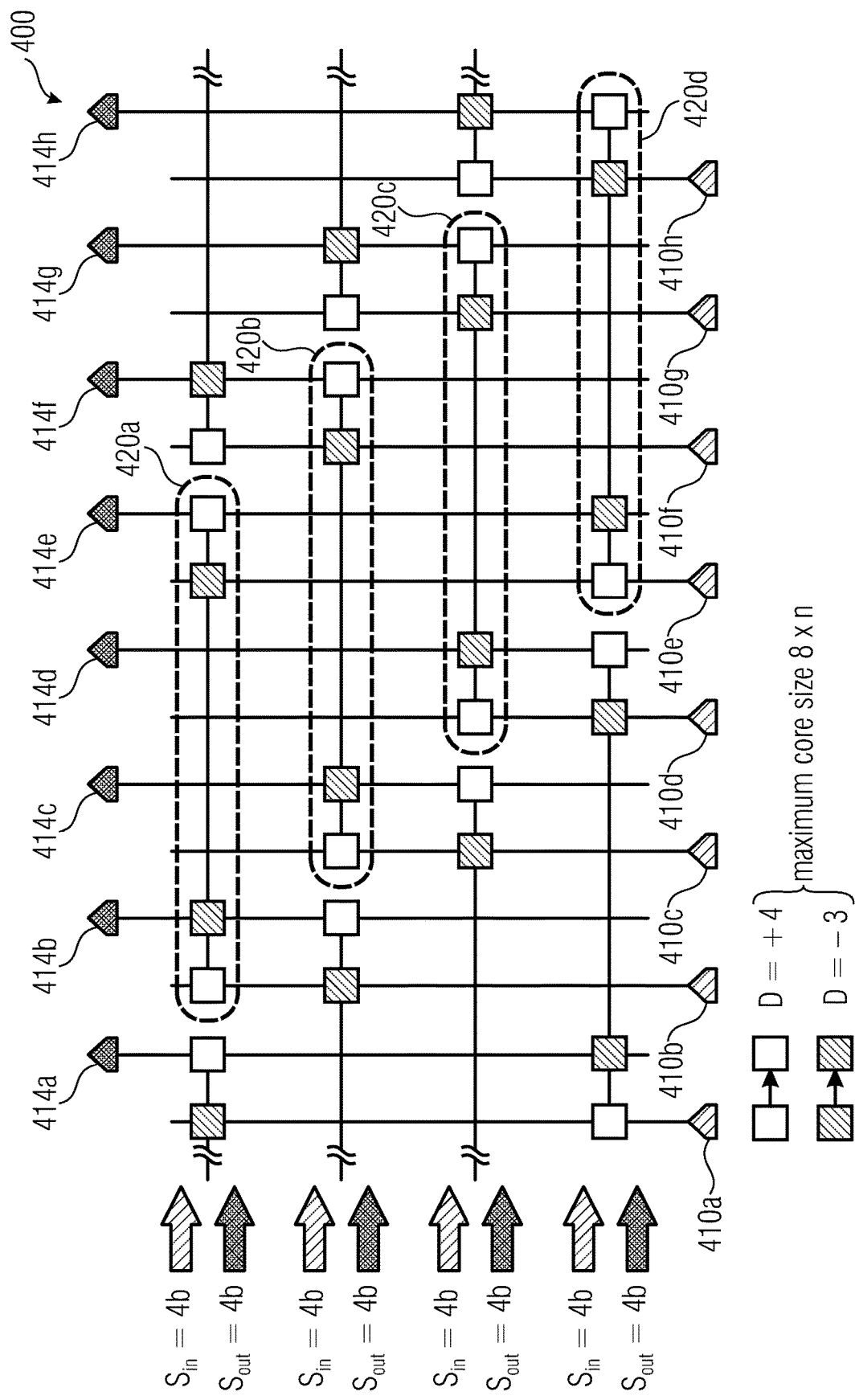
FIG. 4*a* shows a schematic illustration of a memory multiplexer according to an embodiment of the present invention.
Figure 5:
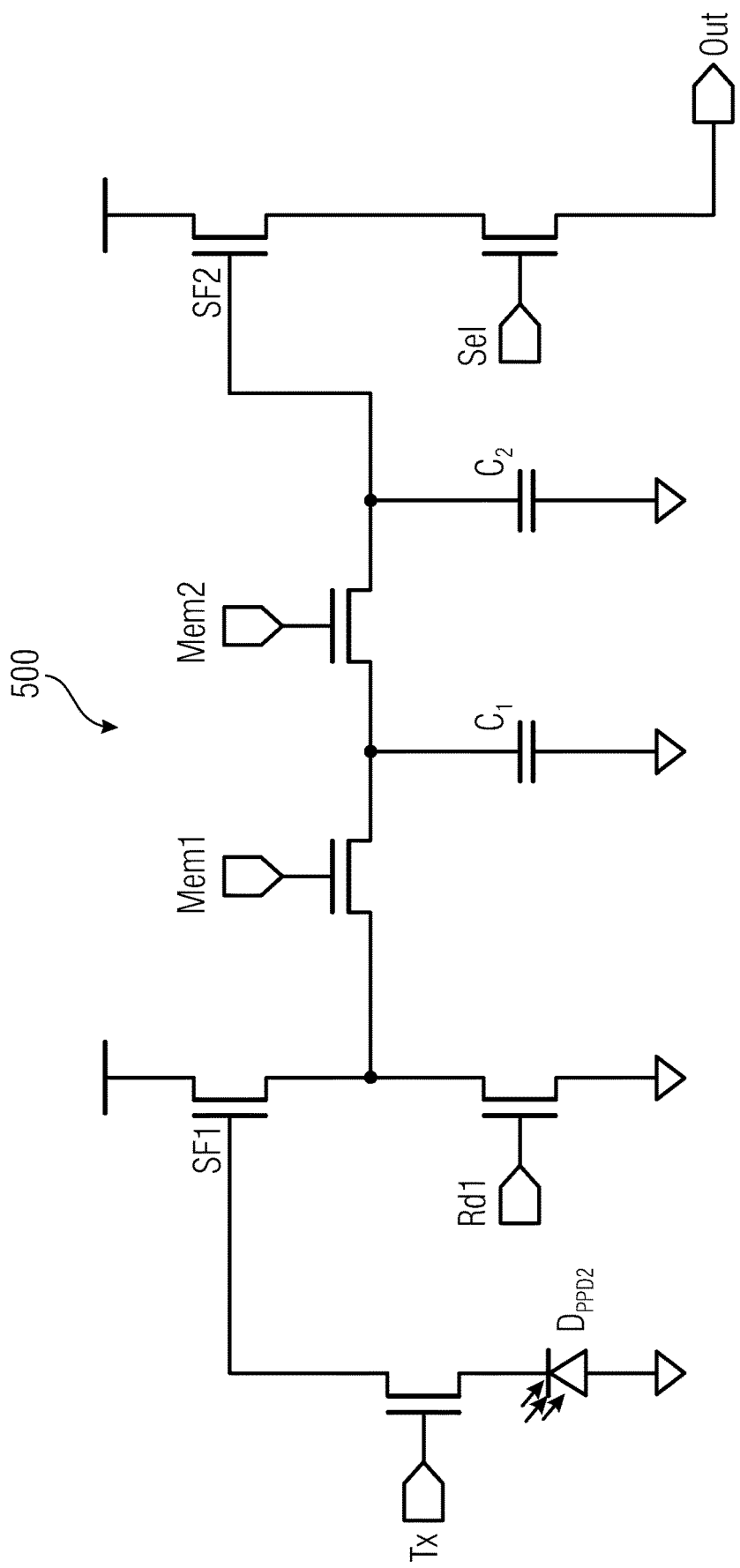
FIG. 5 shows a schematic illustration of an image cell (pixel cell) with a global shutter.
Figure 6:
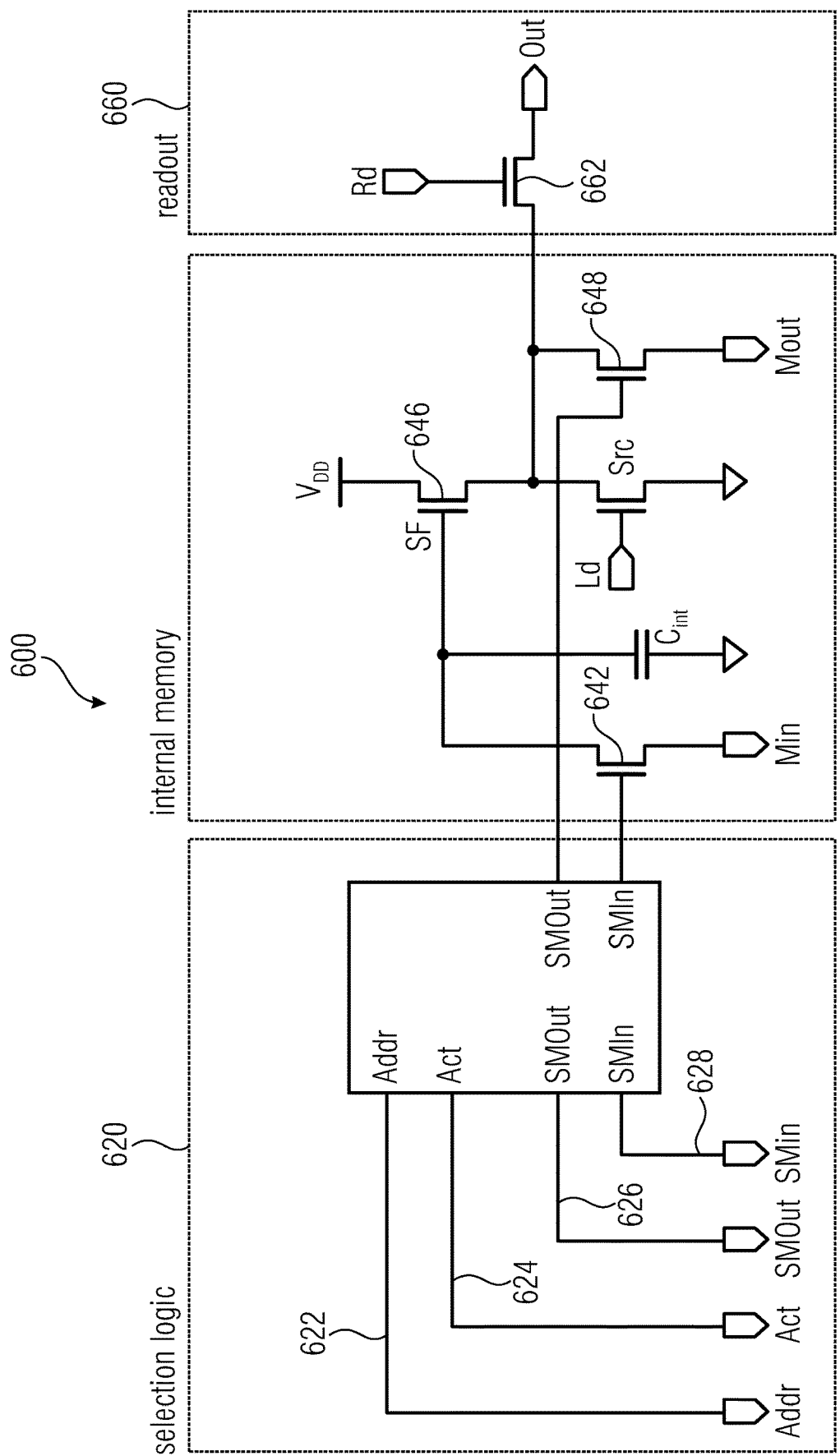
FIG. 6 shows a schematic illustration of a memory cell according to an embodiment of the present invention.

FIG. 2 shows a schematic illustration of an architecture of a "Vision-SoC" (i.e. a Vision-System-on-Chip) with an analog memory matrix. FIG. 3 shows details with respect to a possible analog data path, for example, and FIG. 4*a* shows details with respect to a possible memory multiplexer, for example. In addition, FIG. 5 shows details with respect to a possible pixel cell, or image point cell, and FIG. 6 shows details with respect to a possible memory cell.

The architecture described herein is based on the consideration that, in certain applications, grey value data read out from the image cells, or pixel cells, is to be stored temporarily before the analog-to-digital conversion. A known example are image sensors having image recording rates that are greater than those that may be continuously digitized by the integrated or externally connected analog-to-digital converters. In some cases, the image point values, or pixel values, have to be written very quickly into a directly connected analog memory from which they are slowly read out, processed, digitized and output after completion of the image recording. It has been found that, using this conventional approach, frame rates up to the megahertz range may be achieved. Conventionally, the memory has to be directly in the pixel, or in the image point, which results in a very low filling factor, or the information has to be led from each pixel, or image point, to the edge of the sensor matrix. Furthermore, the amount of data to be output is equal in such cases, and the bottleneck (e.g., in form of the interface) further exists due to the unchanged requirements with respect to the bandwidth of the interface, and a continuous operation is not possible. Due to the complex wiring, this approach also limits the resolution. A realization by means of three-dimensional integration (3D integration) is not considered at this point, as it is out of the question for many applications due to cost reasons.

Aspects of a novel approach, or of the inventive solution, are described in the following.

In particular, it should be noted that embodiments according to the invention are defined by the independent patent claims, and that advantageous implementations are defined by the dependent patent claims.

Aspects of the present invention which may be used on their own are described in the following. However, the invention aspects described in the following may also be used in combination with the embodiments defined by means of the patent claims. In other words, the embodiments defined in the patent claims may be supplemented by features and functionalities or details as described herein, individually or in combination.

In the following, some general aspect of the inventive solution are described first.

In contrast to common methods of the image point-sequential (pixel-sequential) storage, in the new architecture, the storage is not performed continuously, but in interaction with a column-parallel processing unit that may also be referred to as processor element "PE".

FIG. 2 schematically illustrates a possible arrangement as an example.

The arrangement according to FIG. 2 is designated in its entirety with 200. The arrangement 200 includes a sensor matrix 210 which may comprise a plurality of image points, for example. An image point, or "individual pixel", is exemplarily designated with 212. The sensor matrix 210, which may also be referred to as image sensor, includes a plurality of image rows 214a to 214l, wherein each of the image rows 214a to 214l may comprise a plurality of image columns 216a to 216n. For example, the sensor matrix provides for each sensor column an image sensor analog signal 218a-218d, e.g., via an associated column lead.

The arrangement 200 further includes an analog memory matrix 220 and a so-called "SIMD unit" 230. For example, the SIMD unit 230 may be a "Single-Instruction-Multiple-Data" unit, i.e., a unit that processes § multiple data" with a "single instruction".

The arrangement 200 further includes a row controller 250 which may, for example, be coupled to the sensor matrix 210 and which may, for example, be configured to enable a readout of rows of the sensor matrix 210. The row controller 250 may further also be coupled to the analog memory matrix 220 to enable a readout of rows of the analog memory matrix 220. The arrangement 200 further includes a "SIMD controller" 260 configured to obtain control instructions, e.g., via a bus, and to accordingly drive, or configure, the "SIMD unit" 230.

For example, the SIMD unit 230 includes a multiplexer 232 which, on the one hand, is coupled to column leads of the sensor matrix 210 to receive analog column lead signals 218a, 218d from the sensor matrix 210, for example. For example, the multiplexer 232 is further coupled in a bidirectional (alternatively also unidirectional) manner to the analog memory matrix 220. For example, the multiplexer 232 may be configured to connect a group of column leads of the sensor matrix 210 to a group of column leads of the analog memory matrix 220, wherein the assignment between the column leads of the sensor matrix 210 and the column leads of the analog memory matrix 220 may be variable adjusted, for example. For example, the multiplexer 232 may (selectively) connect a preset group of column leads of the sensor matrix 210 temporarily to a first group of column leads of the analog memory matrix 220 and temporarily to a second group of column leads of the analog memory matrix 220, wherein the second group of column leads differs from the first group of column leads.

For example, a processor element PE may be assigned to each column lead of the sensor matrix 210 (or at least to a subset of the column leads of the sensor matrix 210). For example, a first processor element 234a is assigned to a first column lead (which herein belongs to an image column 216a, for example). A second processor element 234b is assigned to a second column lead which, for example, belongs to the second image column 216b (which is coupled to the image elements of the second image column 216b, for example). An n-th processor element 234n may be assigned to a n-th column lead which, for example, belongs to the n-th image column 216n.

For example, the processor elements 234a, 234b, 234c may be essentially identical. Therefore, only the processor element 234a is described in the following. For example, the processor element 234a includes an analog processing 236a, an (optional) analog-to-digital conversion 238 and an (optional) digital processing 240. For example, the analog processing may include a read circuit ("READ"), a difference formation circuit, or differentiation circuit, "DIFF", and a sign determination circuit, or absolute-value formation circuit, "SIGN". Furthermore, the analog processing 236 may also include an essentially analog detection that may determine, e.g., by means of an analog combination of different signal values and by means of a subsequent threshold value decision, whether a particularly characteristic image content is present (e.g., an image content caused by a light line). Thus, for example, the analog signal processing 236 may be configured to detect if a course of an image sensor output signal belonging to a respective image column comprises a course across a plurality of image rows that fulfils a preset condition. Alternatively, the analog processing may also be configured to, e.g., detect if an image point in a column fulfils a certain condition, or if a difference between two spatially adjacent image points fulfils a certain condition, or when a difference between analog values of an image point at different times fulfils a certain condition. A corresponding evaluation may be performed in a column-individual manner so that for each image column 216a to 216n a separate evaluation is carried out as ton at which points in time the corresponding preset condition is fulfilled.

For example, the (optional) digital processing 240 may support or configure the analog processing 236. For example, the digital processing 240 may include an arithmetically logic unit "ALU" which may access flags ("FLAGS"), or may also change the flags. For example, the arithmetically logic unit ALU may further access registers REG in a reading and/or writing manner. For example, the arithmetically logic unit ALU may access a random access memory "RAM" and may be coupled to a bus 242 by means of a bus interface "BUS". Thus, for example, the digital processing 240 may fulfil the function of a microprocessor, or at least a partial function of a microprocessor. For example, the digital processing 240 may be coupled to the analog processing 236 by means of the analog-to-digital converter 238 in order to obtain information that has been preprocessed by the analog processing 236, for example.

For example, the analog-to-digital conversion 238 may operate with comparatively low accuracy that is, for example, lower than an accuracy used for readout of the rows of the sensor matrix 210.

For example, the SIMD controller 250 may be configured to configure the analog processing 236 and/or the analog-to-digital conversion 238 and/or the digital processing 240. For example, the SIMD controller 260 may determine decision thresholds for the analog processing 236 or load a program into the digital processing 240. In addition, the SIMD controller 260 may determine from the outside which region of the sensor matrix 210 is to be transferred into the analog memory 220. For example, this may be determined in a column-individual manner.

Overall, it should be noted that the SIMD unit determines, for example, in conjunction with the SIM D controller 260, based on which image points, or pixels, of the sensor matrix analog values are stored in the analog memory matrix 220. In this case, a column-individual evaluation of column signals by the sensor matrix may at least influence the decision. However, specifications may alternatively or additionally also come from the SIMD controller. For example, the analog values stored in the analog memory matrix 220 may be identical to the analog values provided on the column leads of the sensor matrix 210, or may be preprocessed by the analog processing 230, for example. In this case, the analog processing 236 may perform a difference formation and/or a scaling and/or an absolute-value formation and/or any other analog preprocessing. In addition, the multiplexer 230 may also control where (in which column) the analog memory matrix stores an analog value from a preset image column of the sensor matrix. In addition, it may also be determined in which rows of the analog memory matrix 220 analog values that are based on the column lead signals of the sensor matrix 210 are stored in the analog memory matrix 220.

In the following, further (optional) aspects as to the arrangement 200 are described according to FIG. 2.

For example, a processor element column (e.g., one of the processor element columns 234a, 234b, 234n) belongs to each image point column (or pixel column) of the sensor matrix. A column of the analog memory matrix 220 is arranged therebetween, for example. With different width ratios, several image points, or pixels, may be assigned to a processor element column 234a, 234b, 234n, or a memory column 222a, 222b, 222n, respectively. However, this does not allow a completely parallel processing, but only a partially serial processing.

For example, a minimum functionality of the processor element PE is to select, or drive, the memory cells in the analog memory matrix 220. For example, the information as to whether a memory cell is written into and which memory cell is written into may either come from a memory of the processor element or may be obtained by evaluating the pixel data (or image point data) of the sensor matrix 210.

The following describes a structure of an analog part of a processor element PE. The processor element described serves as an example and may, for example, be used for determining analog values based on the image sensor analog signals. FIG. 3 shows an example of an analog data path in the form of a schematic illustration. In other words, FIG. 3 exemplarily illustrates a fundamental function of the analog part of a processor element (block highlighted in green in FIG. 2) for processing pixel data, or image point data. In other words, for example, the analog data path 300 according to FIG. 3 may take over the function of the multiplexer 232 and of the analog processing 236 (and optionally also of the analog-to-digital converter 238).

For example, the analog data path includes an image point column, or pixel column. Typically, an image point column includes a plurality of image points, for example, one image point per image column. The image point column further includes an image point row selection, or pixel row selection, so that it is possible, for example, to output via a column lead 310 an analog value of a selected image point of the image point column, wherein the analog value represents a brightness value (or a mean brightness value) as was present in a certain time period at the selected image point, for example. Analog signals, or signal values, from the image point column (that are represented by voltages, for example) are here designated with $P_0$ and $P_1$, for example. The analog data path further includes a column read circuit 320 configured to enable readout of an analog value from an image point (or from an image point circuit) and to further enable buffering of an analog value read out from a selected image point. For example, the column read circuit 320 may comprise two capacitors $M_0$, 322 and $M_1$, 324, wherein a first capacitor $M_0$, 322 may be coupled to the column lead 310 via a first switch $S_{P0}$, and wherein the second capacitor $M_1$, 324 may be coupled to the column lead 310 via a second switch $S_{P1}$. In this respect, for example, the capacitors $M_0$, 322 and $M_1$, 324 may be coupled to the column lead 310 at different times and may therefore be charged based on analog values of different image points. Alternatively, the capacitors may also be charged based on analog values of the same image point at different times. The analog data path 300 further includes a difference circuit, or difference formation stage, 330. For example, the difference formation stage may be configured to determine a value difference in an analog manner. For example, a voltage present across the first capacitor $M_0$, 322 may be buffered by a first buffer amplifier $A_{D0}$ whose input is coupled to the first capacitor $M_0$, 322. Furthermore, a voltage present at the second capacitor $M_1$, 324 may be buffered by a second buffer amplifier $A_{P1}$ whose input is coupled to the second capacitor $M_1$, 324. For example, an output of the first buffer amplifier $A_{D0}$ is coupled to a first terminal of a further capacitor $M_D$, 332 via a first switch $S_{D0}$. For example, an output of the second buffer amplifier $A_{D1}$ is coupled to a second terminal of the further capacitor $M_D$, 332 via a switch $S_{P1}$. Thus, for example, if the switches $S_{P0}$, $S_{P1}$ are simultaneously closed, the further capacitor $M_D$, 322 is charged to a voltage that equals a difference of the voltages present at the first capacitor $M_0$, 322 and at the second capacitor $M_1$, 322, for example. A sign of the voltage at the capacitor $M_D$, 332 depends on the voltage at the capacitor $M_0$, 322 being larger than or smaller than the voltage at the capacitor $M_1$, 324. In this respect, the difference formation stage 320 may provide an overall voltage that represents the difference of two analog values from the image sensor provided via the column lead 310. For example, the voltage present at the capacitor $M_D$ may represent a difference of the analog values provided from the image points of the same image column in different image rows.

Thus, the difference formation stage may perform a calculation of the value difference according to $M_D=V_D=M_1-M_0$ (wherein $M_D$, $M_1$ und $M_0$ designate the voltages at the respective capacitors 332, 324, 322) and output the corresponding value difference for further processing. $M_D$ designates the voltage across the capacitor $M_D$. $M_0$ designates the voltage across the capacitor $M_0$, 322 and $M_1$ designates the voltage across the capacitor $M_1$, 324. For example, a preprocessed signal is designated by $V_{sgn}$.

In addition, the voltages present at the capacitors $M_0$ und $M_1$ may also be provided to an analog-to-digital conversion (for example, by means of the analog-to-digital converter 238) so that the voltages present at the capacitors $M_0$, 322 and $M_1$, 324 may also be processed by the digital processing 240 of the processor element 234a.

The analog data path 300 further includes a sign/value determining stage 340 configured to determine a sign and/or the value of the voltage present at the capacitor (or in general of the voltage provided by the difference formation stage 330). In particular, the sign/value determining stage 340 provides a signal describing the sum of the voltage provided by the stage 330, and a further signal describing a sign of the voltage provided by the stage 330. The sign of the voltage provided by the stage 330 (e.g., of the voltage across the capacitor 332) may be determined by means of a simple threshold value comparison. In addition, the voltage present across the capacitor 332 as a differential signal, for example, may be converted into a ground-related signal, for example, by connecting the more negative terminal of the capacitor 332 to the ground and connecting the more positive terminal of the capacitor 332 to the output. For example, if the first terminal (lower terminal) of the capacitor 332 is more negative than the second terminal (upper terminal), the switch $S_{Gnd0}$ and the switch $S_{S1}$ may be closed. Therefore, a voltage is present at an output of the stage 340 which is positive with respect to the reference potential (or the ground). On the other hand, if the first terminal (lower terminal) of the capacitor 332 is more positive than the second terminal (upper terminal) of the capacitor 332, the second terminal (upper terminal) may be connected to the reference potential (ground) via the switch $S_{Gnd1}$, and the first terminal (lower terminal) of the capacitor 332 may be connected to the output of the stage 340 via the switch $S_{S0}$. For example, a corresponding sign signal that is also provided by the stage 340 may indicate the capacitance of the capacitor voltage and may be stored separately (e.g., in a digital memory).

The analog data path 300 further includes a column write circuit 350 configured to decide into which column of the analog memory matrix the output signal of the stage 340 is to be written. For example, the column write circuit 350 may comprise a multiplexer 352 and may be configured to find an appropriate route through the multiplexer 352. For example, a further buffer amplifier $A_S$ may be connected between the output of the stage 340 and an input of the multiplexer 352. For example, the buffer amplifier may be coupled to one of the terminals of the capacitor 332 via the switches $A_{S0}$ and $A_{S1}$ so that the input of the buffer amplifier $A_S$ is respectively connected to the more positive of the terminals of the capacitor 332, for example. With this, for example, a voltage that is positive with respect to the ground potential may be applied to the buffer amplifier $A_S$, as was described above with respect to the stage 340. For example, based on a corresponding control signal, the multiplexer 352 may then select to which of the memory columns the signal present at the output of the buffer amplifier $A_S$ is to be applied, or stored into. Thus, outputs of the multiplexer 352 are connected to different ones of the memory columns, one of the memory columns being designated with 360. For example, the memory column comprises a row selection, or line selection, so that a row, or line, that is accessed by means of a write access and/or a reading access is selected in each one of the memory columns. The memory columns also comprise control terminals for column-reading and/or for column-writing.

In this regard, it should be noted that, for example, different memory rows may be selected for reading and/or writing at a given point in time in different memory columns. For example, the processor elements of the individual columns may individually determine into which row of the analog memory matrix a current value is to be written.

In addition, it is to be noted that a value read out from the memory column may optionally also be fed back to a column lead, for example, and may therefore be stored in one of the capacitors 322, 324, for example. For example, such a feedback may be useful if differences between values successively read out are to be formed.

In addition, it is to be noted that driving the stages 320, 330, 340, 350, 360 may be performed by the digital processing 240 and/or the SIMD controller 260, for example. In addition, it is to be noted that the nodes of the analog data path 300 may also be coupled to one or several threshold value deciders that may evaluate whether certain conditions are fulfilled by the analog signals. For example, based on the presence of a certain condition, it may be decided whether an analog value is to be stored in a memory column, or into which row of the memory column the analog value is to be stored, or into which column of the analog memory matrix an analog value is to be stored.

The following briefly explains the operation of the analog part, or the analog data path.

If, for example, image point data, or pixel data, such as from the image point cell, or pixel cell, illustrated in FIG. 5 are corrected by means of CDS, or if two successive or spatially adjacent image point values, or pixel values, are subtracted from one another, this data $P_0$ and $P_1$ is successively output via a column lead (e.g., via the same column lead). By driving the switches $S_{P0}$ and $S_{P1}$, a storage of the values $M_0$ and $M_1$ is carried out on the two storage cells that are exemplarily configured as capacitors 322, 324. Subsequently, the difference value $V_D$ may be further processed, e.g., by an analog-to-digital conversion (A/D conversion) with complete or reduced resolution, or any other evaluation of the analog value. The result generated in this analysis or a value taken from the memory of the processor element PE may be used to determine whether and with which sign the analog value $V_D$ is to be stored as memory value $M_D$ after the activation of $S_{P0}$ and $S_{P1}$ by driving to $M_0$ and $M_1$ by means of $A_{D0}$ and $A_{D1}$. By means of the switches $S_{Gnd0}$, $S_{Gnd1}$, $S_{S0}$ and $S_{S1}$ of the sign circuit, it may be determined whether the sign of $M_D$ is to be inverted ($S_{Gnd1}=S_{S1}=1$ and $S_{Gnd0}=S_{S1}=0$) or not ($S_{Gnd1}=S_{S0}=0$ and $S_{Gnd0}=S_{S1}=1$), resulting in a new signed, zero-related value $V_{Sgn}$. The driver $A_S$ ensures that the output value Vs is set to zero for negative values $V_{Sgn}$. If both values are stored in two memory cells or a sum is determined by means of a non-illustrated additional circuit and stored, for example, it is possible to determine in an analog manner the absolute value of a difference and to store the same. However, it should be noted that the processing described in this section is optional and that only individual ones of the processing steps may be present.

The following explains how columns of the memory matrix may be selected. However, the selection of columns of the memory matrix as well as details thereof are to be regarded as optional.

For example, the assignment of the target column of the memory matrix is done in a multiplexer (Mux) that makes it possible to swap columns, for example. For example, the assignment may be done by the multiplexer 232 or by the multiplexer 352. The multiplexer is optional and may be used to, for example, vary an assignment between an image column and columns of the analog memory in which analog values belonging to the image column are stored or from which these may be read in the sensor matrix. Optionally, the multiplexer may also be changed. FIG. 4a exemplarily illustrates a possible realization for the multiplexer.

FIG. 4a shows a schematic illustration of a multiplexer 400 that, for example, may take over the task of the multiplexer 232 or the task of the multiplexer 352. For example, the multiplexer comprises a plurality of multiplexer input leads 410a to 410h. The multiplexer further comprises a plurality of output leads 414a to 414h. For example, the different input leads may be assigned to different processor elements 234a to 234n. For example, the output leads 414a to 414h may be assigned to different memory columns (or column leads) of the analog memory matrix 220.

The multiplexer further includes a plurality of connection leads, or connection structures, 420a, 420b, 420c, 420d that may each be connected to a plurality of columns, for example, and that are offset to one another so that different ones of the connection structures 420a to 420d may be connected to different sets of input leads and to different sets of output leads, for example, the first connection structure 120 may be connected to the input leads 410b to 410e and the output leads 414b to 414e. The second connection structure 420b may be connected to the input leads 410c to 410f and to the output leads 414c to 414f. In a similar manner, the third connection lead 420c may be connected to the input leads 410d to 410g and to the output leads 414d to 414g. The fourth connection lead 420d may be connected to the input leads 410e to 410h and to the output leads 414e to 414h. Thus, for example, one of the input leads 410b to 410e may be connected via the first connection structure 420a to one of the output leads 414b to 414e, for example, by connecting the connection lead 420 to one of said input leads and to one of said output leads. Thus, for example, the connection lead 420a may be used to connect the connection lead 410b to the output lead 414e. However, the connection lead 420a may be used to connect the input lead 410e to the output lead 414b.

Thus, for example, each of the connection leads may be used to connect an input lead to an output lead having a smaller index than the input lead, or to connect the input lead to one of the output leads having a larger index than the input lead (figuratively speaking: which is further on the right than the input lead). However, the connection lead may also be used to connect an input lead to an output lead having the same index. In this regard, it is to be noted that an input lead (e.g., input lead 420a) may be connected to the associated input leads (e.g., to the input leads 410b to 410e) via switches that are arranged, for example, at intersections between the input lead and the respective connection lead. A connection lead (e.g., the connection lead 420a) may also be connected to the associated output leads (e.g., the output leads 414b to 414e) via switches that are arranged at the intersections between the connection leads and the output leads, for example.

A length of the connection leads 420a to 420d determines by how many column positions an input lead may be shifted with respect to an output lead coupled thereto via a connection lead.

The following again describes the function of the memory multiplexer according to FIG. 4a in general. Input signals from the columns (e.g., from the processor elements PE) are supplied from below, e.g., via input leads 410a to 410h marked in blue. For example, the output signals are also upwardly output column-by-column (e.g., via the output leads 414a to 414h). Leads (e.g., the connection leads 410a to 410b) by means of which the input leads and output leads may be connected are led horizontally. This is done by switches that are illustrated in FIG. 4a as squares at the intersections. For example, as illustrated, the switches may be set row-by-row. The number of the switch/control signals needed in each connection row for linking the horizontal connections (e.g., the leads 420a to 420d) to the input leads ($S_{in}$, 410a to 410h) and output leads $S_{out}$ (e.g., 414a to 414h) results from the length of the connected pieces (e.g., bordered in grey) and/or from the horizontal distance of the discontinuations (e.g., the length of the connection leads 420a to 420d). In the present case, the length of such segments and the number of the pairs per segment is four in each row. The discontinuations and connections may be arranged in steps, but other arrangements are also possible. It is also possible to select more and longer segments; however, this results in a larger number of control leads per row. In the example according to FIG. 4a, the two maximum ranges of the connections are indicated in color or by hatching with D=+3 (green or not hatched) and D=−3 (orange or hatched), resulting in a total range and therefore maximum achievable block size for filter matrices of eight.

If read-back during the storage is to be possible, the number of the paths through the multiplexer doubles. Read-back may be needed or helpful if a driver whose dispersion ("mismatch") is to be corrected by means of control during storage (a so-called storage with closed loop or "closed-loop storage") is used in each memory cell.

In summary, it may be stated that the multiplexer enables transferring analog values from a preset column of the image sensor to different columns of the analog memory matrix, or transferring analog values from different columns of the image sensor into a preset column of the analog memory matrix. In addition, it is also possible to achieve filtering (e.g., a spatial filtering) by accordingly driving the multiplexer and accordingly scaling analog values, for example, by combining in a weighted manner analog values of different image points in a mutual memory cell of the analog memory matrix. Thus, filtering according to a "filter matrix" may be achieved by the weighted combination of analog values.

The following describes details regarding addressing and storage. However, it should be noted that the details described below are to be regarded as optional.

During storage, for example, the column outputs 414a to 414h of the multiplexer 400 are connected to the inputs of the memory matrix. Furthermore, in some cases, an assignment of a row from the processor elements PE has to be carried out. There are several possibilities for this selection for storage. For example, programmable shift registers or address decoders by means of which a row is selected for storage are conceivable. Exemplarily, FIG. 6 depicts a memory cell 600 having an address decoder 620. A write access is carried out by setting an address (Addr) on an address bus 622 and by activating a connection between SOut, or SIn, and the switch transistors (Sel1 or Sel2) by means of an activation signal 624 (Act). For example, setting a voltage on the memory capacitor Cint is done via the analog input Min and the read-back of the voltage resulting by means of the source follower SF is done via the analog output Mout. A variation in which no internal current source transistor Src is used, but instead the same external current source is used for all memory source followers is also conceivable. The actual readout of the internal state is achieved by a row-by-row drive equal to that for reading out the image point cells, or pixel cells.

In other words, the processor element PE belonging to a column of the image sensor may deliver address information 622 that indicates which row of the respective column of the analog memory matrix is to be accessed to a selection logic 620 assigned to a column of the analog memory matrix. In addition, the corresponding processor element may also deliver an activation signal 624 to signalize a memory access. In addition, further control signals 626, 628 may be delivered by the processor element, for example, which indicate whether a write access is to be carried out on the memory cell selected by the address information 622, or whether a read access is to be carried out on the memory cell selected by the address information 622. In addition, a write/read access may also be carried out, wherein a write signal (e.g., Min) may be delivered to the memory cell and a read signal (e.g., Mout), may be read back from the memory cell, for example, to enable a precise storage using feedback. For example, the write signal Min may be delivered by one of the outputs 414a to 414h of a multiplexer. If there is no multiplexer, for example, the signal Vs may also be applied as the write signal Min. Then, the selection logic 620 ensures that the correct row is activated in the respective column to which the selection logic 620 belongs. For example, during writing, the transistor 642 is activated in the row selected by the address information 622 such that, for example, the capacitor Cint is connected in the selected memory cell to the column lead on the analog memory matrix. If a certain memory cell is to be read out, it is selected by appropriate address information 622, and, responsive to a corresponding control signal, the associated transistor 648 is set to a conducting state so that a sink terminal (source terminal) of the source follower transistor 646 is connected to the corresponding column lead (or readout column lead) of the analog memory matrix.

In this regard, it should also be noted that a write-in operation and a readout operation were described herein, in which a row may be selected in each column of the analog memory matrix. For this purpose, for example, each memory column of the analog memory matrix comprises an associated selection logic that selects a row of the analog memory matrix in a column-individual manner. Advantageously, the control of this selection logic is done via an associated processor element, wherein the different processor elements that are assigned to the different columns of the image sensor may select different rows of the analog memory matrix at a time. Thus, in a processing step (or in a clock cycle, for example), a first row of a first column of the analog memory matrix and a second row of a second column may be described, wherein the second row differs from the first row.

However, the analog memory matrix may also be read out in a conventional manner so that, for example, the same row is read out in all columns in a readout step. For example, this may be done via a readout circuit 660, wherein readout transistors 662 of an entire memory row of the analog memory matrix may be simultaneously activated (e.g., by a mutual readout signal), for example. Thus, for example, all columns (or at least a column region including a plurality of columns) may be simultaneously read out, enabling an efficient transmission of the data read out to a digital further processing (after a corresponding analog-to-digital conversion).

In summary, it should be noted that rows to be written and/or rows to be read out may be selected in a column-individual manner by means of corresponding selection logics, wherein the selection is done by the processor elements operating in parallel, for example. However, the analog memory matrix may also be read out in a different manner, advantageously also row-by-row, for example, in order to provide data for a further digital processing. For example, the row-by-row readout may be controlled by the row controller 250.

The following describes details with regard to a time of access, however, these details are to be regarded as optional.

There are various options for the write operations to the memory. For example, this may be done in the processor element PE simultaneously or shortly after reading out the image points, or pixel cell, but before evaluating (e.g., without prior check whether the analog values are to be obtained for further processing). In this case (for example, if the analog values are to be obtained for further processing), the stored value is taken over by selecting the next memory cell in the corresponding column (therefore avoiding a prompt overwriting, for example). If the stored value is to be discarded, the selected address (which is represented by the address information 622, for example) remains the same and the memory value is overwritten by the next readout value.

If all write accesses are completed, e.g., if one of the memory columns is full, an output operation has been requested or the predefined region of interest (RoI) has been completely read out, a row-by-row output operation is initiated, for example. The row-by-row drive takes place simultaneously for all columns and in the same manner as when reading out the sensor matrix.

In the exemplary realization according to FIGS. 5 and 6, the memory contents are output as voltages such as with the image point cells, or pixel cells. For example, it is possible to only read out the memory cells successively or alternately with the image point cells (pixel cells). Post-processing in the processor elements (PE) may, depending on their parameterization and their internal state, take place for all of them at the same time or only with the participation of certain columns. For example, the latter enables a very fine adjustment of a region, or a region of interest ("RoI"), and further compression by suitable removal of data, i.e., deactivation of the output of inactive columns.

In other words, for example, the processor elements of the individual columns may decide whether data of the respective column, or image sensor column, is to be stored in the analog memory matrix or not. For example, by selectively choosing the individual memory information, it may be achieved that only information of image sensor columns that has been identified as being relevant for a later evaluation (e.g., by digital processing after analog-to-digital conversion) is stored. This identification as to which data is to be considered as being relevant may be done in a column-individual manner, for example.

It should also be noted that a data output Out of the image point cell, or pixel cell 500, exemplarily shown in FIG. 5 may be connected to an associated column lead of the image sensor matrix, for example. The image sensor, or rather the image sensor matrix, may comprise a matrix of image point cells 500 according to FIG. 5. The data output Out of the image point cell 500 may be connected to the lead 310, for example. For example, selection terminals Sel of several image point cells of a row of the image sensor, or the image sensor matrix, may be connected to each other so that the output of data by the image sensor matrix takes place simultaneously for all columns of an image row or at least for a plurality of columns of an image row.

FIG. 4b shows a further embodiment of a multiplexer that may take over the function of the multiplexer 232 or the function of the multiplexer 352, or may replace the multiplexer 400, for example.

The multiplexer 450 comprises connection leads 470a to 470d and 472a to 472d that each extend across 4 column lead positions and that are offset from each other in the manner shown, for example.

For example, the connection leads 470a to 470d and 472a to 472d may be connected to input leads (e.g., input leads 460a to 460b) via switches. Furthermore, for example, the connection leads 470a to 470d and 472a to 472d may be connected to output leads, e.g., output leads 464a to 464d) via switches. In this regard, for example, the multiplexer may be used to create a variable connection of input leads and output leads, wherein an adjustable offset may be achieved between input leads and output leads. For example, by accordingly driving the switches, it may be achieved that a group of input leads is connected in a direction that is offset to a group of output leads. By appropriately driving the switches, it may be determined in which direction the offset is to take place and how many leads the offset is to amount to.

With the multiplexer 450, the range is (only) 3 in both directions. From below, not four but only two selection leads (to the right or to the left) are needed). For example, the other two selection leads are redundant (and may optionally also be omitted). In principle, it is to be noted that two or more switch positions from below are useful.

The following describes an optional addition to the concept.

For example, the readout path (e.g., the connection 110a to 110d between the image sensor 120 and the readout arrangement 100 or the connection 218a to 218d between the sensor matrix 219 and the SIMD unit 230 or the connection between an image point column and a column read arrangement) may be supplemented such that a standard DC offset ("0" corresponds to a full modulation of the signal, for example) output is subtracted. For this purpose, for example, a corresponding circuit is included (e.g., in the readout path) that draws the same current from both difference leads until the lead with the lower potential reaches the lower threshold, then, for example, both current drains are stopped (or kept at a constant level).

3. Application Examples

The following describes various possibilities for using the illustrated architecture and the resulting advantages.

3.1 Sheet of Light

In the following, background information is given with regard to the execution of a laser light section.

In the considered method "sheet of light" ("SoL"), as is exemplarily schematically illustrated in FIG. 7, a laser line 710 (generated by a laser 708) is projected onto a three-dimensional surface 720 to be measured that is viewed with a camera 730 and a triangulation angle α between the laser plane and the camera plane. For example, a point P on the surface is located at a height h which, in turn, results in a deflection x from a fixed zero point along a column in a camera image. By evaluating the brightness information (grey values in the camera image) along this column, for example, a position of the maximum intensity whose location x with respect to the fixed zero point corresponds to the height h is determined. For the arrangement illustrated in FIG. 7a, for example, the same is calculated according to the equation h=x sin (a).

For example, the object of image processing to be solved consists in an exact determination of the position of the maximum of the grey value along an image sensor column, advantageously with sub-image point accuracy (sub-pixel accuracy). For example, this object may be solved by the inventive image sensor system described herein (e.g., in a following section).

FIG. 8 illustrates different variations for solving this problem.

In other words, FIG. 8 shows a schematic illustration of different variations for determining a position $x_0$ of a maximum of the grey value along a sensor column. Abscissas 810, 840, 870 each describe a coordinate x along a column of the image sensor, or the image sensor matrix. Ordinates 812, 842, 872 each describe brightness values in arbitrary units. Courses 820, 850, 880 describe the course of the brightness values along image points of the respective column of the image sensor, which may be represented by analog values on the column lead, for example. Different methods are described in the following:

1. In a first method, which is exemplarily shown in FIG. 8, the maximum of the brightness, or of a brightness value, is to be found by calculating the increase of successive brightness values and by registering the value $x_{max}$ upon a sign reversal, or a zero crossing (positive to negative). This method provides exactly this one image point position, or pixel position.
2. In a second method, a comparison of the grey value to a threshold $N_{t1}$ is carried out for each image point, or for each pixel, and the corresponding values $x_a$ and $x_b$ (for example, indices of the image rows preceding or succeeding on overshoot of the threshold value) are registered for the overshoot or undershoot, respectively. The position of a maximum may be estimated based on the equation $x_c=(x_a+x_b)/(2)$ and may be indicated with a sub-image point accuracy (or sub-pixel accuracy) of (1)/(2).
3. The third standard method is based on the assumptions that the laser line comprises a Gaussian-shaped brightness distribution and that the sensor provides a linear transfer function of imaged brightness and determined digital grey value (or analog grey value). Under these circumstances, the maximum of the curve equals its center of gravity ("CoG"). When compared to a threshold value $N_{t2}$, the number of the grey values needed for calculating the threshold value may be reduced above this threshold value and the accuracy may be increased. Thus, for example, the position $x_c$ of the center of gravity may be determined with high accuracy and may be used as a measure for a maximum of the location of the brightness.
4. For further methods, for example, the assumption from 3. that a Gaussian projected line is present and that linearity is given is not required to be correct. For example, they are based on an evaluation of the course of the curve for determining the maximum.

It was found that all methods have in common the fact that all grey values have to be analyzed successively in each column in a certain given region of interest (RoI).

The more precisely the position has to be determined or the larger the interval along a column, the greater the number of grey values to be analyzed. Thus, the region of interest (RoI) primarily determines the speed of image acquisition and image processing.

In sheet of light systems (SoL systems) with standard image sensors, all grey values of a region of interest (RoI) are digitized and output. Image acquisition, conversion and output typically determine the profile rate based on the sensor interface. Due to various effects (noise, "speckles", multiple reflections, volume control), the course of the curve is sometimes very disturbed, which is why different filterings have to be done (or should be done) before determining the curve maximum, resulting in an increase of the complexity of the algorithms, especially for large sub-image point (sub-pixel) accuracies better than (1)/(8). Particularly for very fast sheet of light systems, these algorithms are implemented in programmable digital hardware (FPGA), resulting in a correspondingly high technical effort for high profile rate requirements.

[1] introduces a programmable image sensor ("vision system-on-chip") that may perform one-dimensional convolutions (1D convolutions) when reading out the sensor matrix and therefore enables very good column-by-column curve smoothing. Determining the boundaries according to threshold value method 2 is possible with very high reliability and a very high profile rate; however, a sub-pixel resolution is better than (1)/(2) and is only achievable by different threshold values, which limits the speed.

The following describes a new approach, or an inventive solution. The inventive solution may optionally use some or all of the above described concepts.

In other words, the following describes other aspects of the invention concept which may be used on their own, but also in combination with the embodiments defined in the claims. The aspects described herein may also be used to improve or substantiate the embodiments defined in the claims.

In the following, some general aspect of embodiments according to the present invention are described.

With the novel memory architecture described herein, it is possible to column-specifically record and output in a compressed manner only relevant data. i.e., grey values, in an interval according to the threshold value method 2 or around the maximum according to method 1. For example, this drastically reduces an amount of the grey values to be output from the sensor (or from the analog memory) and to be processed. Thus, height profiles such as in methods 3 or 4 may be determined by means of relatively simple digital hardware or even on a standard processor.

In order to achieve the compression, for example, it is determined separately in each column, e.g., by evaluating the pixel data read out from the sensor matrix, whether the grey value data is relevant, i.e., is approximately within the interval indicated in the color red in FIG. 8 or not. All data located outside is neither recorded nor output (i.e., for example, is not stored in the analog memory or is immediately overwritten.

For example, the processor element may be configured in a column to detect a maximum, as was described based on FIG. 8a, and to store, for example, a specified (or variable) number of analog values (of the image sensor column leads) "around the maximum" (i.e., of image rows that are located around the detected row position of the maximum) into the analog memory for further processing. For this purpose, for example, the processor element may determine by means of analog processing (e.g., through a difference formation of analog values of two adjacent image sensor rows and a subsequent sign determination) whether there is a maximum (wherein, for example, it may also be checked whether an absolute value of the intensity is sufficient). If the presence of a maximum is detected, such as shown in FIG. 8a, the processor element may further drive the analog memory matrix such that analog values from rows that are located around a row position of a detected maximum are stored in the analog memory for further processing, for example. The processor element belonging to an image column of the image sensor matrix may, for example, in response to detecting a maximum as shown in FIG. 8a, change from an operation state in which analog values in the analog memory matrix are cyclically overwritten into an operation state in which analog values that are located at a row position around the detected row position of the maximum are stored for further processing (and are no longer directly, or cyclically, overwritten).

As an alternative example, the processor element may detect, e.g., via analog preprocessing with a threshold value comparison, if analog values of a column lead of the image sensor are larger than a specified threshold value, e.g., larger than the threshold value $N_{t1}$ shown in FIG. 8b. Thus, for example, such analog values which are larger than the threshold value $N_{t1}$ shown in FIG. 2, i.e., which belong to a region of sufficiently high intensity and therefore belong with a high probability to an image region onto which a laser line is imaged may be stored for further processing in the analog memory matrix.

The analog values selected for storage by the respective processor element may be digitized for further digital processing (analog-to-digital converted) and be subsequently digitally processed at a later point in time (for example, if a region of interest of the image sensor is completely processed by the processor elements).

Determining an interval (e.g., of a number of analog values per column stored for further processing) may be performed in different ways. For example, a selection of the appropriate method is performed, among other things, based on the expected scattering of the laser line width imaged on the sensor under consideration of the "noise carpet" and the analog memory available in relation to the expected number of laser lines. For example, the number of analog values per column stored for further processing (i.e., the number of the analog values stored in a column if the presence of a laser line is detected, for example) may be pre-specified or may be set by a corresponding configuration of the processor element. In addition, in which lines of the image sensor analog values are to be stored into the analog memory matrix for further processing may be decided in the processor element by means of an analog processing or by means of a digital processing or by a combination of an analog processing and a digital processing in a column-individual manner.

For the exemplary descriptions, it is also assumed that, simultaneously to reading out the sensor matrix, a value is written into the memory that "false" write operations are revoked by overwriting the memory content. If an overwrite occurs promptly (e.g., before a readout of analog values for further digital processing), the written values are considered here as not being stored for further processing. Rather, analog values are considered to be stored for further processing if they remain stored in memory matrix until readout for the purpose of further processing. Thus, for example, only the addressing may be changed in the processor element as a result of the analysis. For example, if it is detected that an analog value is relevant for further processing and is therefore to be stored for further processing, the processor element may change address information (e.g., the address information 622) before a subsequent memory access so that the address information no longer references a memory cell whose content is to be stored for further processing. On the other hand, the processor element may, for example, leave the address information unchanged in order to cause a prompt overwrite upon the next write access, for example, if it has been found that the analog value just stored is not to be stored for further processing. This approach has the advantage that the evaluation may take place simultaneously to the relatively time-consuming storage. Sequentially processing the steps "reading out the image points (pixel), evaluating, addressing the memory cell and storing in the analog memory" would take too long in some instances (but still makes sense under certain circumstances).

The following describes storage with a fixed interval. This approach may be considered as being optional.

For storage with a fixed memory content, for example, a certain number of cells in each column, i.e., the length of the memory interval, which are driven according to a ring buffer is determined in the beginning. For the variation having address selection, in some cases, the address encoder in each processor element (or at least in some processor elements) may count from a start address to an end address and may then be reset. The length of the memory interval (length offset) determines how many values are stored, and the start address plus the length offset determines which memory region is currently active.

A time for a correct storage may be determined in different ways, depending on the desired complexity and requirement of the later evaluation of the stored analog values.

A first option consists of triggering the storage process on the basis of the image point position (pixel position) of the maximum value $x_{max}$ (corresponding to the above described variation 1 according to FIG. 8a). Since the maximum value determines the center of the envelope curve, the storage process has to (or should) be stopped for this profile approximately after half of the length of the interval. For determining the position of the maximum with a sub-pixel (sub-image point) accuracy, for example, the value $x_{max}$ and the assigned address value have to, or should, be stored for later evaluation besides the content of the ring buffer. In this case, either each grey value or also each n-th grey value may be stored, which may be realized by incrementing the address counter of the memory only after each n-th image row (pixel row) read out.

In other words, when considering the processor element assigned to the image column of the sensor matrix, it first receives analog values of successive image rows of the image sensor and cyclically stores these in the sense of a ring buffer in a memory region of the analog memory matrix, e.g., in a predetermined region of rows of a predetermined column of the analog memory matrix. For example, the processor element increments (or decrements) an address counter that selects the corresponding row of the analog memory matrix after each write process (or alternatively after each n-th write process. If the address counter reaches a boundary of the predetermined memory region, i.e., an upper limit (or lower limit) of the predetermined memory region, the address counter is reset in order to again reference the lower limit (or upper limit) of the predetermined memory region. If the processor element now detects the presence of a maximum, as has been exemplarily described based on FIG. 8a, the processor element stores a current state of the address counter and possibly also (or alternatively) information about an upper limit of the current memory region and/or information about a lower limit of the current memory region in a digital memory. For example, the processor element may continue to drive the address counter such that, upon detecting the maximum, only a certain number of analog values are stored in the predetermined memory region in order to also store analog values that follow the maximum, for example. For example, if there are (enough) analog values preceding the maximum and analog values following the maximum are stored in the ring buffer, the processor element may select a new memory region by setting the address counter to an initial value of a new memory region, for example. In this new memory region, analog values from further rows of the image sensor matrix may again be stored, and said method may be repeated.

For each profile (e.g., for an image), the number of the elements (rows) in the analog memory to be digitized in relation to a row number of the region of interest (RoI) on the pixel field, or image point field, results as the compression (e.g., with regard to a memory requirement). The larger the region of interest (RoI), the larger it is. For example, if nine analog values are needed for 1000 sensor rows, there is a compression of approximately 111:1, which also represents a maximum acceleration of the output.

In this respect, it is evident that a significant compression and therefore acceleration may be achieved. This is all the more true since, for example, in a sheet of light, there is often only a single line, while, on the other hand, a large part of the image is dark (or is significantly below the brightness of the laser line.

The following describes storage with a dynamic interval. In this respect, it is to be noted that storage with a dynamic interval may be optional and may, for example, be used alternatively to "storage with fixed interval".

Compared to the previous variation (storage with fixed interval), this variation has the advantage that grey values that may be evaluated in a good manner are stored for laser lines of very different widths. A disadvantage, however, is the unpredictability of the number of grey values to be stored and therefore of the number of laser lines that may be stored.

For an activation and deactivation of the storage, for example, the positions of the two threshold values $x_a$ and $x_b$ of the above described variation 2 (For each pixel, a comparison of the grey value to a threshold $N_{r1}$ is carried out and for the overshoot and undershoot, the corresponding values $x_a$ and $x_b$ are registered. Then, the position of the maximum is estimated based on the equation $x_c=(x_a+x_b)/(2)$ and is indicated with a subpixel accuracy of (1)/(2)) may be used. It is advantageous that a ring buffer for the storage may be omitted and it may be directly decided based on the state of the processor element whether the row address in the memory is to be incremented or not. Besides the memory content, for example, $x_a$ and $x_b$ or $x_a$ and the associated offset to $x_b$ are output. The remaining statements apply in the same way as for storage with a fixed interval.

In other words: all analog values larger than a certain threshold value may be stored in the analog memory for further processing, for example. In addition, information as to which rows of the image sensor the stored analog values belong to are stored. The number of the analog values stored per line depends on how many of the analog values belonging to the line are larger than a corresponding threshold value.

3.2 White Light Interferometry

In a second possible application of embodiments according to the invention, white light interferometry, the object of image processing consists of outputting, in a stack of, for example, 10,000 images, pixel-by-pixel, or image point-by-image point, the grey values or differences of successive grey values in interference modulations, i.e., when they change significantly.

There are different approaches to solve this object. If, for example, zero crossings are to be determined as exactly as possible, their occurrence may be used as a trigger, for example, to store one or several associated analog values in the memory pixel (image point) concerned. If the zero crossing has occurred, for example, the memory address in the corresponding column is incremented and the value stored simultaneously with the zero crossing determination is kept. For example, the determination of the zero crossing is done in the processor element (PE) by comparing the current sign to the previous one that is digitally stored. The image number in the analog value is output for the pixel (the image point).

Depending on the coherence length and stack size, an achievable compression may be up to 1000. Depending on the surface being viewed, it is important to ensure that the memory is read out at sufficiently short intervals.

In summary, it should be noted that in white light interferometry, for example, the processor element may determine when a zero crossing of a difference of successive grey values has occurred. In this case, the processor element (or generally the readout arrangement) may determine that an analog value is to be stored in the analog memory for further processing. Thus, for example, only such analog values that are considered to be relevant, i.e., that belong to a zero crossing of a difference value, are stored in the analog memory. This significantly reduces the amount of data stored as compared to storing all analog values.

3.3 Further Application Examples

A possible application example consists in the use, or implementation, of a filter operator. For example, the filter operator may be formed by the readout arrangement 100. Here, for example, the SIMD unit 230, or the analog data path 300, may be used. For example, the filter operation may be performed by analog signal processing, wherein analog values of several image sensor cells may be stored in an analog manner and be combined (for example, in a weighted manner) in an analog manner, for example.

Output values of such filter operations (i.e., for example, a weighted combination of analog values of several image sensor cells) may also be used for deciding whether analog values are to be stored in the analog memory for further processing or not. However, the output values of the filter operations may also represent the analog values to be stored in the analog memory for further processing.

Thus, for example, by means of the analog realization of a filter operator, an effort in digital image processing may be reduced. In addition, by using a filter operator, or a filter operation, the decision as to which analog values are to be stored in the analog memory for further processing may be made more reliable.

A further embodiment includes the use, or implementation, of tracking. For example, tracking may be used to track lines, or the movement of lines, in an image field. In this way, for example, which analog values are to be stored in the analog memory for further processing may be efficiently determined.

Another application example consists in the use, or implementation, of a flexible region of interest (RoI). For example, by parallelly processing a plurality of image sensor analog signals from a plurality of column leads, it is possible to individually determine for each column from which rows analog values are to be stored in the analog memory for further processing. For example, a corresponding control may be performed by the SIMD unit or by a processor element PE.

In addition, the above described multiplexer may also help with the definition of a flexible region of interest. For example, for different rows of the image sensor matrix (or for different rows of the analog memory, or for different write operations of the analog memory), it may be individually decided which "shift" (with respect to the assignment) is present between column leads of the image sensor matrix and column leads of the analog memory. This shift may be flexibly set by the multiplexer so that, for example, analog signals originating from a parallelogram-shaped region of the image sensor matrix are stored in a "rectangular" region of the analog memory (with respect to the organization of the analog memory in rows and columns). This also contributes to a flexible definition of a region of interest. For example, the corresponding control may again be performed by the SIMD unit or the processor elements.

Another possible application example consists of a pattern projection.

4. Embodiment According to FIG. 9 and Examples According to FIGS. 10, 11 and 12

Figure 9:
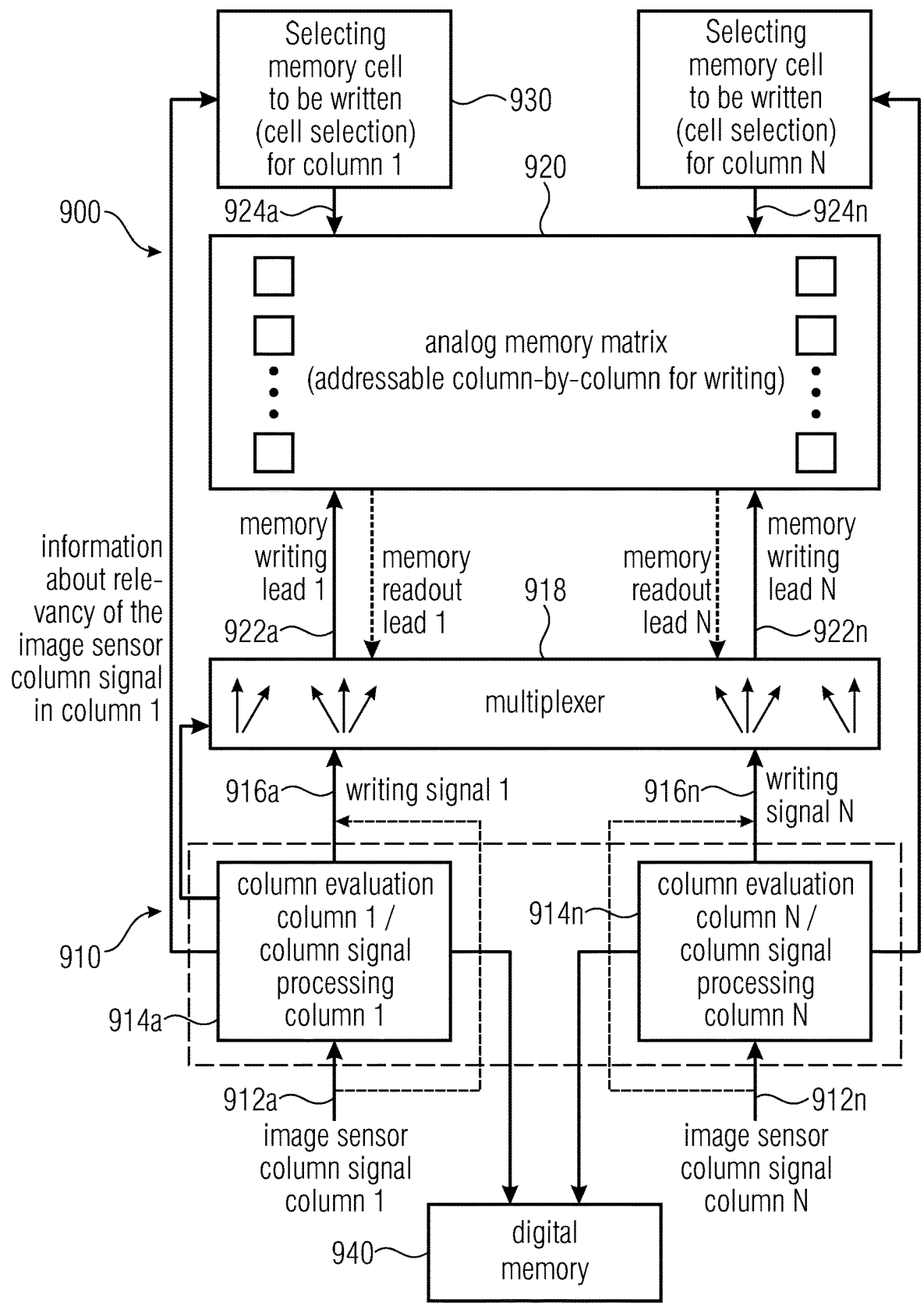
FIG. 9 shows a schematic illustration of a system according to an embodiment of the present invention.

FIG. 9 shows a schematic illustration of a system according to an embodiment of the present invention.

The system according to FIG. 9 is designated in its entirety with 900.

The system 900 includes a readout arrangement 910 configured to receive image sensor column signals 912a to 912n, and configured to cause a storage of selected analog values in an analog memory 920 based on the same. For this purpose, the readout arrangement 910 is connected to memory write leads 922a to 922n.

Furthermore, the readout arrangement is configured to determine which row of the respective analog memory matrix columns is to be written. For this purpose, the readout arrangement may provide for each column of the analog memory matrix a corresponding row selection signal 924a to 924n, for example.

In this regard, it should be noted that in some embodiments, the number of columns in the analog memory matrix may differ from the number of the columns of the image sensor matrix. However, the numbers may also be the same.

For example, the readout arrangement includes for all columns (or at least for a plurality of columns) column-individual column evaluations and/or column signal processings. The column evaluations and/or or column signal processings may receive the image sensor column signals 312a to 312n and provide write signals 916a to 916n which are made available to a multiplexer 918, for example. For example, the multiplexer may set an assignment between the write signals 916a to 916n and the memory write leads 922a to 922n, region of the write signals 916a to 916n may be variably assigned to a region of the memory write leads 922a to 922n, for example. For example, a connected region of write signals may be assigned to a connected region of memory write leads, wherein the region of write signals may be column-offset compared to the region of memory write leads (e.g., so that an i-th write signal is assigned to a j-th memory write lead and so that an i+1-th write signal is assigned to a j+1-th write lead, etc., wherein i and j differ).

The column evaluations and/or or the column signal processings 914a to 914n, which may, for example, each take over the function of the analog data path 300 shown in FIG. 3 entirely or partially and that may additionally comprise the function of the SIMD unit 230 entirely or partially, are configured to, for example, decide from which columns analog values are to be stored for further processing in the analog memory matrix. In connection with an apparatus 930 for selecting memory rows to be written (which may operate in a column-individual manner, for example), it is therefore possible to select in which columns of an analog memory matrix analog values from which image points are stored for further processing, or which memory rows of the analog memory matrix are overwritten or remain unchanged.

In summary, it may be stated that by the interaction of the column evaluation/column signal processing 914a to 914n, the multiplexer 918 and the selection 930 of memory rows to be written, the readout arrangement may decide in a very finely granulated manner which analog values are to be stored for further processing into the analog memory matrix 920 and where the analog values are stored in the analog memory matrix. Additional information with respect to which analog values were stored in the analog memory matrix for further processing may, for example, be stored in a digital memory 914 and is then available for further processing.

Thus, in summary, it may be stated that the column evaluations 914a to 914n take over the task of the SIMD unit 230 and/or of the analog data path 300, for example. For example, the multiplexer 918 may correspond to the memory multiplexer 400, while the write signals 916a to 916n may, for example, correspond to the signals 410a to 410h, and while the signals 922a to 922n may, for example, correspond to the signals 414a to 414h.

Figure 10:
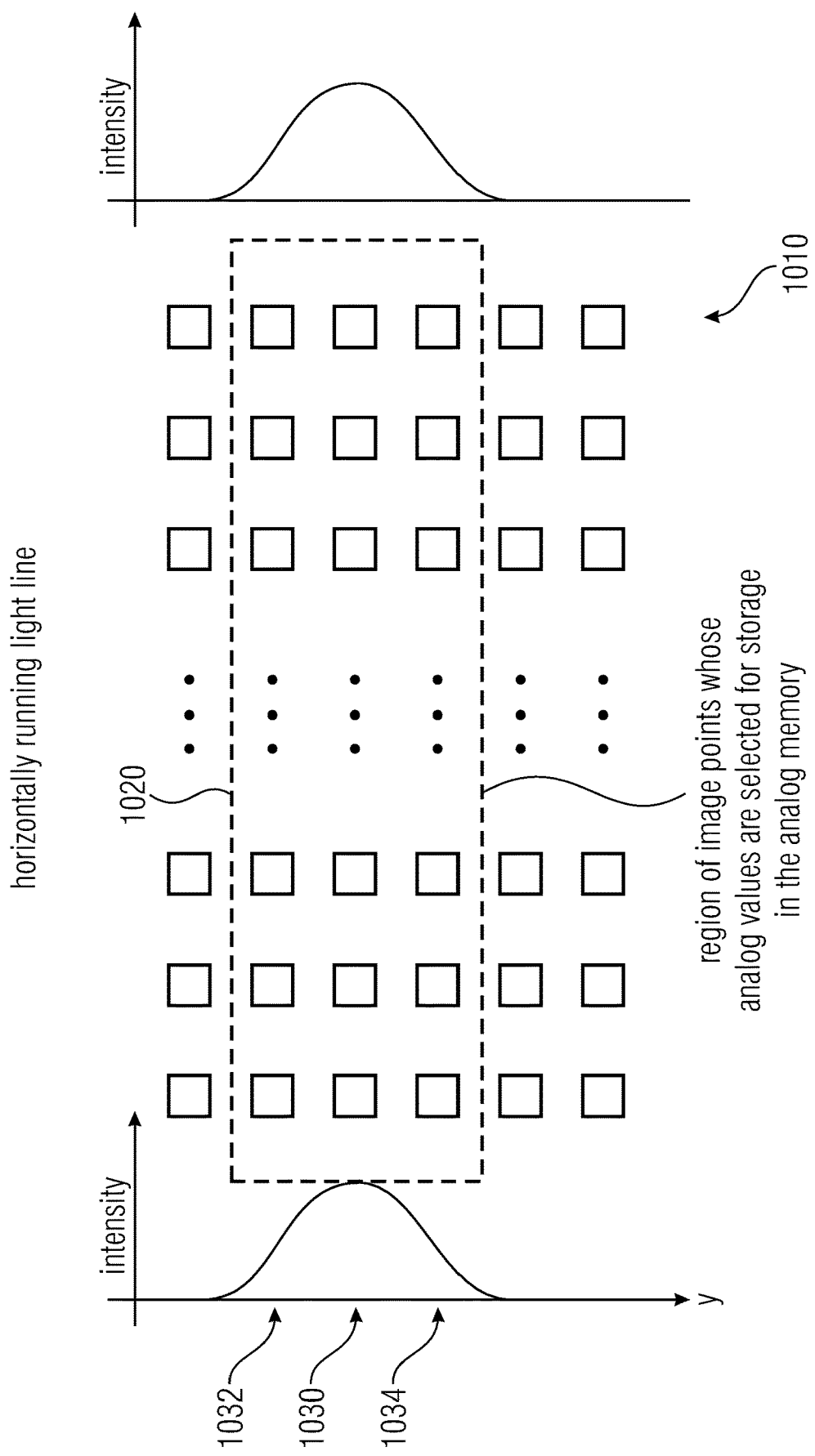
FIG. 10 shows a schematic illustration of an evaluation upon presence of a horizontally running light line.
Figure 11:
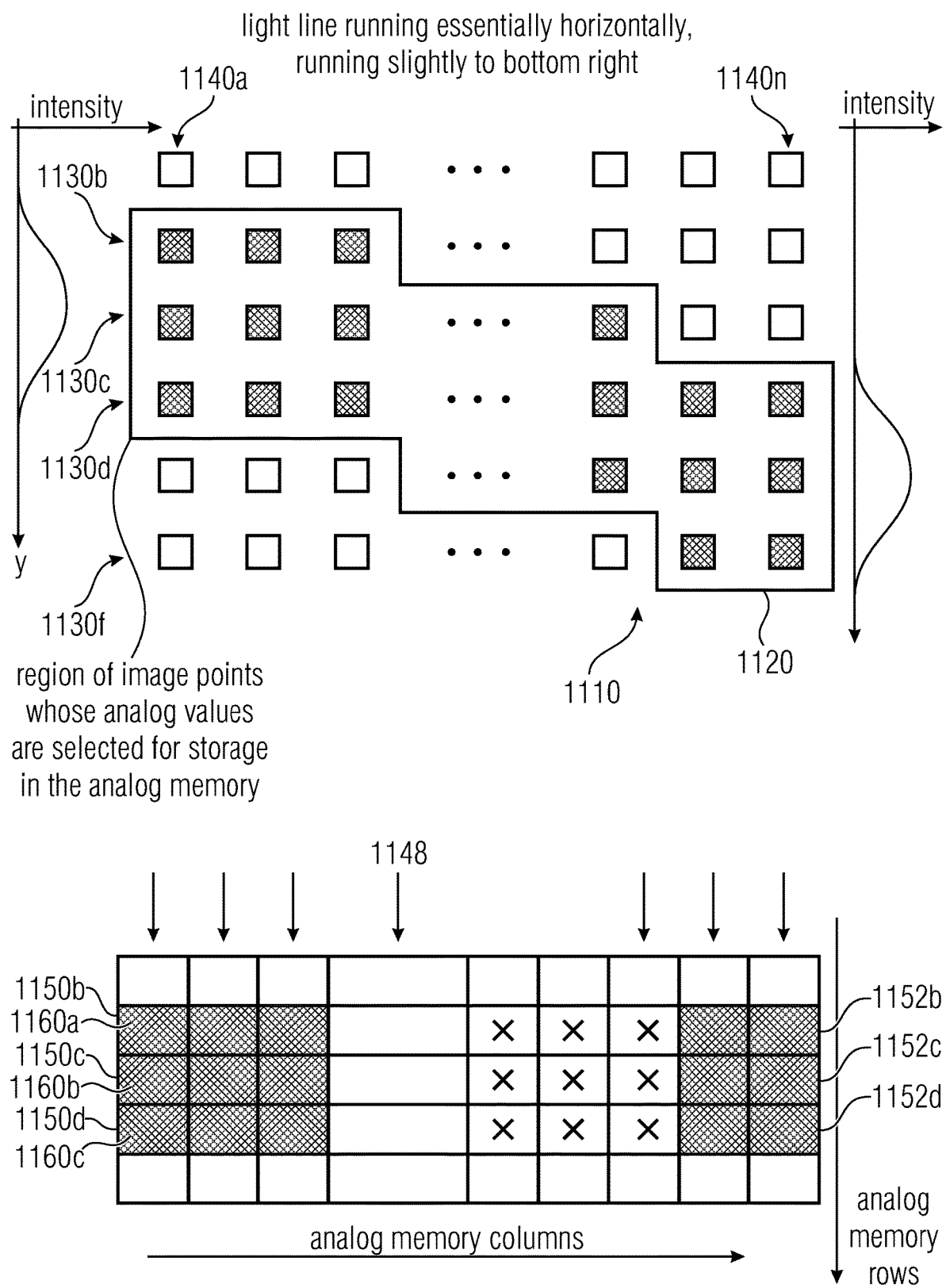
FIG. 11 shows a schematic illustration of an evaluation upon presence of an essentially horizontally running light line which is slightly inclined towards the bottom right.
Figure 12:
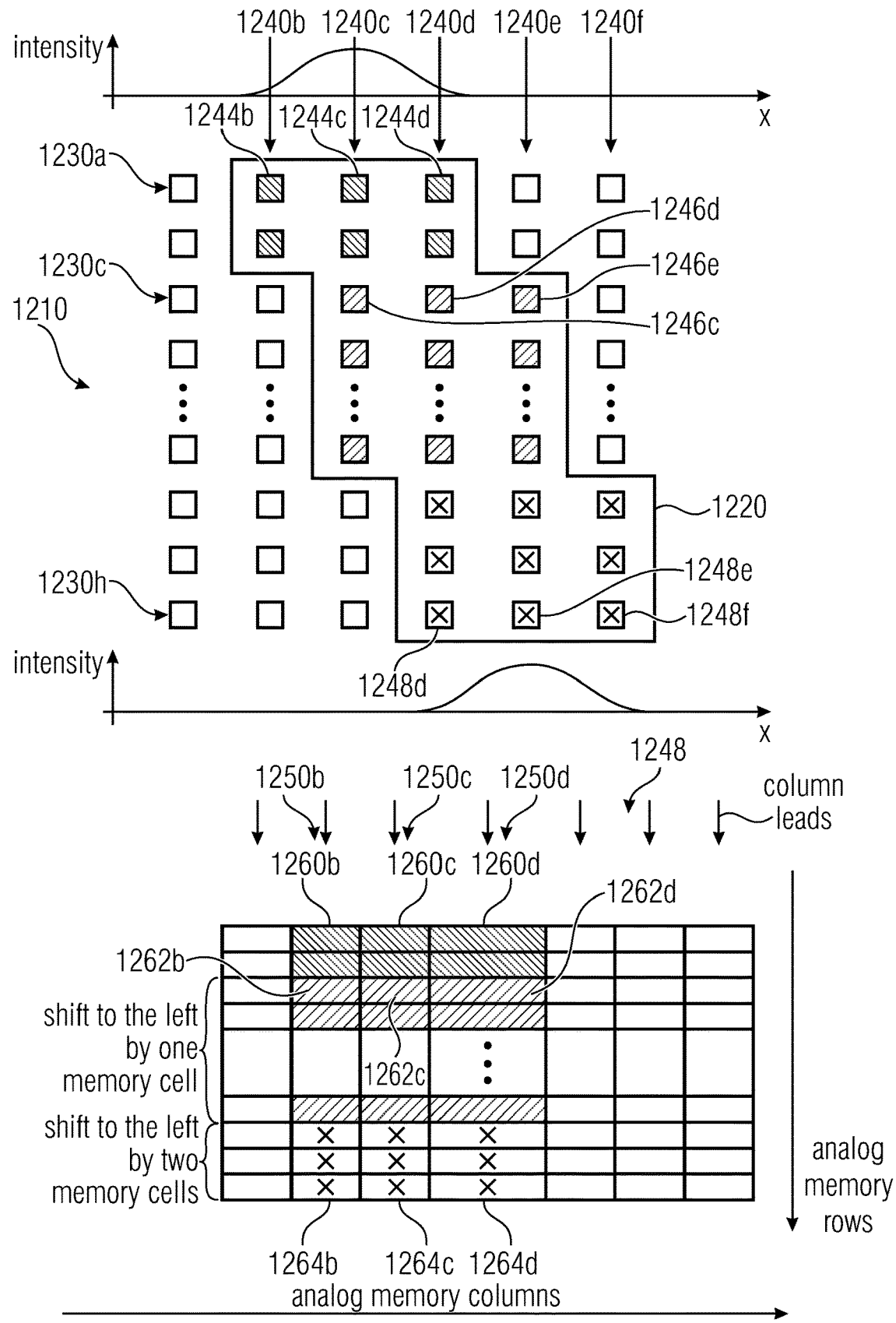
FIG. 12 shows a schematic illustration of an evaluation upon presence of an essentially vertically running light line that is slightly inclined towards the bottom right.

The following describes specific embodiments based on FIGS. 10 to 12. It is to be noted that the functionalities described based on FIGS. 10 to 12 may be realized individually or in combination.

FIG. 10 shows a schematic illustration of an evaluation upon the presence of a horizontal light line.

In particular, FIG. 10 shows a section 1010 of an image sensor matrix, where it is assumed, for example, that image points (pixels) in a region 1020 are illuminated with an intensity that is larger than a specified threshold value (or alternatively fulfil another condition that makes the image points appear relevant for further processing). For example, the region 1020 is essentially rectangular. For example, a middle image row 1030 of the region 1020 may be illuminated with a maximum intensity, while outer image rows 1032, 1034 of the region 1020 are illuminated with a lower intensity. For example, the remaining image rows in the surrounding area of the region 1020 are only illuminated with an intensity that is below a threshold value, or may alternatively be classified in a different manner as being irrelevant for further processing.

Now, by means of the readout arrangement, it may be detected that analog signals of the image points in the region 1020 are to be stored in the analog memory for further processing. Here, for example, analog signals of different image points may be selected and the evaluation means assigned to the first image column may decide that, for example, (only) analog values originating from image sensor cells (image points, or image sensor matrix cells) in rows 1032, 1030, 1034 are stored in a first column of the analog memory for further processing. Corresponding decisions may also be made for analog values of image sensor matrix cells in the remaining columns.

As a result, it is achieved that analog signals from the image sensor cells in the region 1020 are stored in the analog memory for further processing, while analog values from image sensor cells outside of the region 1020 are not stored for further processing. This prevents that irrelevant information is stored in the analog memory for further digital evaluation.

A slightly more complex example is described based on FIG. 11. A section of the image sensor matrix is shown at reference numeral 1110. However, it is assumed here that a bright line essentially running horizontally across the image sensor matrix runs slightly from top left to bottom right. A region of image sensor matrix cells in which a light intensity is larger than a specified threshold value (or which fulfils a different condition) is exemplarily designated with 1120. It can be seen that the region 1120 is no longer rectangular but has "steps" due to the slightly inclined course of the light line. For example, the region 1120 extends in a first considered column 1140a from a second row 1130b to a fourth row 1130d. In a column 1140n considered last, the region 1120 extends from the fourth row 1130d to a sixth row 1130f (wherein the corresponding widths are only examples).

In order to determine the position of the light line very accurately (ideally with a sub-image point accuracy), analog values of image points of the region 1120 are to be stored in the analog memory, while analog values of image points outside of the region 1120 do not have to be stored (and should not be stored) since they do not carry essential information.

This may be achieved by the readout arrangement described herein.

For example, when evaluating image sensor analog signals from a first column lead belonging to the column 1140a, the readout arrangement may detect that analog signal values indicating a relevant brightness are only present in the image rows 1130b to 1130d. Thus, for example, the readout arrangement may drive the analog memory such that only analog values originating from the image rows 1130b to 1130d from the column 1140a are stored in the analog memory for further processing. Corresponding analog values originating from the image points 1130b to 1130d are stored, for example, in rows 1150b to 1150d of the analog memory matrix that is schematically illustrated at reference numeral 1148. For example, analog values originating from the first image column 1140a are designated with 1160a to 1160c.

With regard to the image column 1140n, the associated processing column of the readout arrangement detects, on the other hand, that analog values of image rows 1130b and 1130c are not relevant. Therefore, analog values originating from these image rows 1130b, 1130c are not stored for the image column 1140n in the analog memory matrix for further processing (but are at most temporarily stored there and immediately overwritten).

If, however, the readout arrangement belonging to the image column 1140n detects that relevant intensities are present in the image rows 1130d to 1130f for later evaluation, the readout arrangement causes corresponding analog values to be stored, advantageously in the same rows of the analog memory matrix 1148 in which the analog values of the sensor matrix cells (image points) of the first column 1140a have been stored. The corresponding analog values belonging to the column 1140n are designated with 1152b to 1152d.

Thus, it should be noted that the readout arrangement of each column individually identifies (based on specified and/or programmable criteria and possibly using signal preprocessing and/or signal pre-filtering) which signals from which rows 1130b to 1130f of the image sensor matrix belong to a line. The analog values belonging to a line are then stored in the same rows of the analog memory (e.g., in the memory rows 1150b to 1150d) even if the line runs diagonally across the image sensor matrix. Thus, analog values belonging to a line are stored in a "rectangular" region of the analog memory (e.g., in the rows 1150b to 1150d) even if the line runs diagonally across the image sensor. This is achieved simply by the fact that analog values are only stored in a region of the analog memory intended for the storage of a line if they—upon channel-individual evaluation—fulfil a certain condition, i.e., are above a threshold value or in a certain region around a maximum value, for example.

A readout of the analog values belonging to the line is therefore possible in a simple way since the analog values are located in a rectangular region of the analog memory so that they are available by a row-by-row readout.

FIG. 12 shows a further example. An image sensor matrix is shown at reference numeral 1210. Here, a line gives significant brightness values in a region 1220 that is not rectangular since the lines runs somewhat diagonally from top left to bottom right. For example, the line that runs across the image sensor matrix generates an intensity course such that in each image row approximately three adjacent image sensor cells are illuminated with a "significant" light intensity (which result in sensor signals above a threshold value, for example).

The line runs such that, for example, in a first considered row 1230a, there is a significant light intensity in a second image sensor column 1240b, in a third image sensor column 1240c and in a fourth image sensor column 1240d. In a last considered row 1230h, for example, there is a significant light intensity in the fourth column 1240d, in the fifth column 1240e and in the sixth column 1240f. Column-parallel processing of image sensor analog signals of the row 1230a by means of the readout arrangement results in the fact that there are significant light intensity values (represented by "significant" image sensor analog signals) present in the columns 1240b, 1240c, 1240d. Thus, for example, analog values of the image points 1244b, 1244c, 1244d are selectively stored in the analog memory, for example, in the memory cells 1260b, 1260c, 1260d of the memory columns 1250b, 1250c, 1250d. For example, this is achieved by setting the multiplexer for direct passthrough so that the analog signals are passed through from the columns 1240b, 1240c, 1240d of the image sensor matrix to the columns 1250b, 1250c, 1250d of the analog memory.

If, for example, the readout arrangement determines upon the evaluation of signals from row 1230c of the image sensor matrix that there are significant brightness values in the columns 1240c, 1240d, 1240e, the readout arrangement may configure the multiplexer such that analog signals of the image sensor columns 1240c, 1240d, 1240e are passed through to the columns 1250b, 1250c, 1250d of the analog memory, for example, which may be connected to a column offset between the image sensor columns and the analog memory columns. Thus, for example, analog signals from the image sensor cells 1246c, 1246d, 1246e may be stored in the memory locations 1262b, 1262c, 1262d. Thus, the analog signals from the image points 1246c, 1246d, 1246e are stored in the same columns of the analog memory as the analog signals from the image points 1244b, 1244c, 1244d, although the analog signals in the sensor row 1230c that are stored for further processing are output on a "column-by-column offset" set of column leads (compared to analog signals of the image row 1230a that are to be stored for further processing).

Finally, when considering the image row 1230h, it can be seen that there are relevant intensities in the columns 1240d, 1240e, 1240f (image cells 1248d, 1248e, 1248f). By accordingly adjusting the multiplexer setting that is controlled by the readout arrangement, it is achieved that analog values belonging to the image cells 1248d, 1248e, 1248f are stored in the memory cells 1264b, 1264c, 1264d. Thus, it is achieved that analog values of a region running diagonally across the image sensor having significant intensities are stored in a rectangular region of the analog memory, which significantly facilitates later readout and evaluation. On the one hand, the readout arrangement may detect in which columns there are significant analog values (for example, representing significant light intensities). Furthermore, the readout arrangement may also detect if column regions in which there are significant analog values, or analog signals (or light intensities), shift from row to row (of the image sensor). If such a shift of the column regions with significant analog values (to be stored) is detected, the readout arrangement may drive the multiplexer accordingly in order to achieve that the analog values of different image rows to be stored are stored in the same column region of the analog memory. Thus, all analog values belonging to a line are stored in a rectangular region, even if the line runs diagonally across the image sensor. This is achieved by the interaction of the components of the readout arrangement, in particular also with the multiplexer.

5. Method According to FIG. 13

Figure 13:
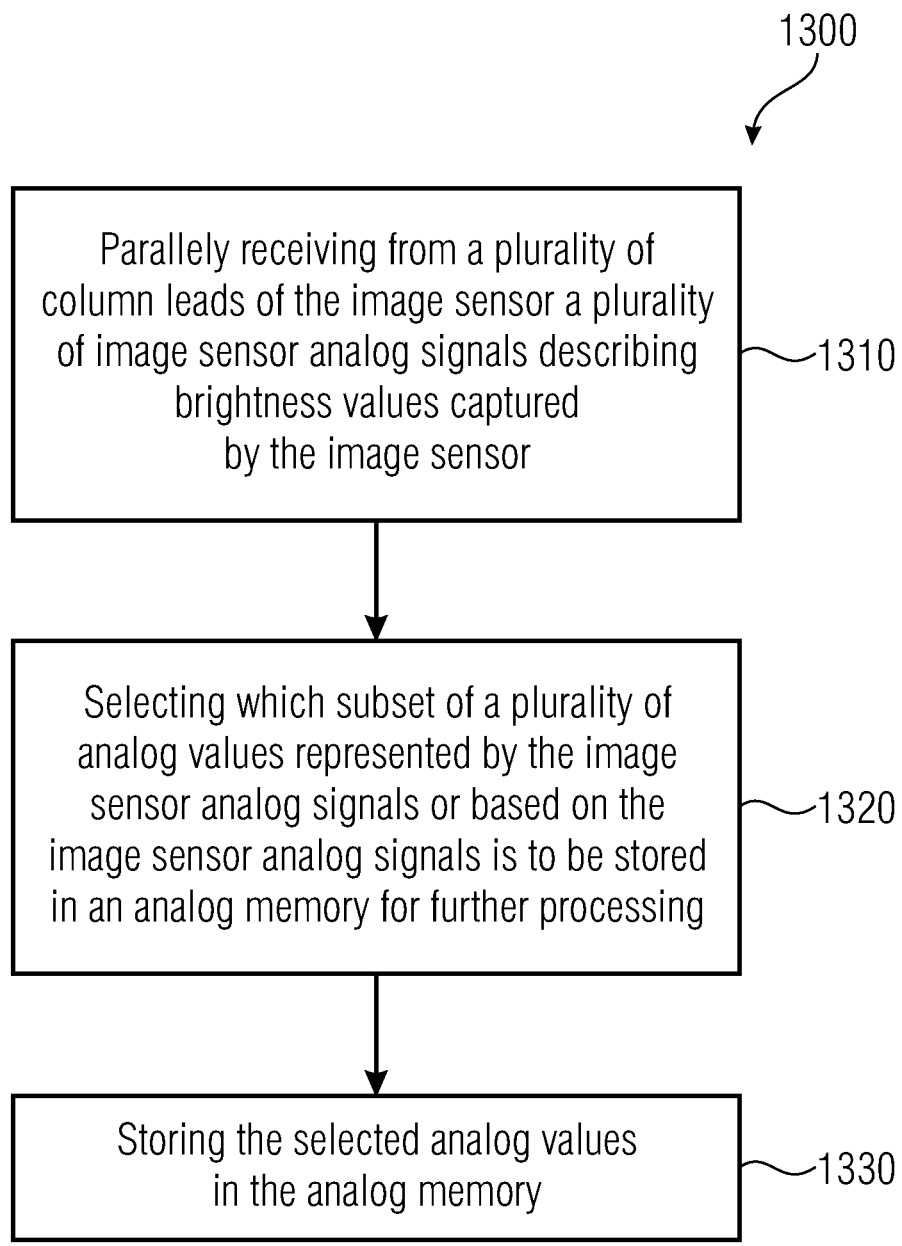
FIG. 13 shows a flow diagram of a method according to an embodiment of the present invention.

FIG. 13 shows a flow diagram of a method 1300 according to an embodiment of the present invention.

Method 1300 includes parallelly receiving 1310 from a plurality of column leads of the image sensor a plurality of image sensor analog signals describing in an analog manner brightness values detected by the image sensor.

The method further includes selecting 1320 which subset of a plurality of analog values represented by the image sensor analog signals or based on the image sensor analog signals are to be stored in an analog memory for further processing.

The method further includes storing 1330 the selected analog values in the analog memory.

Optionally, the method may be supplemented by all features and functionalities of the readout arrangement and the image sensor system—individually or in combination.

6. Further Aspects

The following describes aspects of the invention which may be employed individually or in combination. The aspects described herein may also be employed in combination with the embodiments defined in the patent claims and in combination with the embodiments described above.

Image sensor system-on-chip comprising:
 column-parallel processor elements,
 column-parallel analog memories,
 and controllers, e.g.,
  a row controller for the sensor matrix, (optional)
  a row controller for the memory matrix (also together with that for the sensor matrix), (optional)
  and a controller for the processor elements (optional)
 a memory matrix (optional) (e.g., the analog memory)

having one or several memories per cell
   storage by means of a capacitor, or
   storage by means of a current storage cell
which may be addressed column-by-column for writing and reading-back, for example
   by means of an address decoder, or
   by means of programmable shift registers
which may be written in a column-by-column manner, for example
   with a lead for activating the write operation, and/or
   with one or several analog signal leads, and/or
   with or without a lead for activating the reading operation with closed-loop storage, and/or
   with or without a read-back lead
which may be addressed in a row-by-row manner for the column-parallel output:
   for outputting voltages
     actively or passively, and/or
     actively with a cell-local current source for the source follower, and/or
     actively with a current source per column
   for outputting currents, and/or
   for outputting charges
     as pulse currents
     as switched capacitances
A mixed-signal processing unit (optional)
   having a multiplexer (optional)
     with one or several connections per column, and/or
     for a random access to the memory in the same column or different columns
       in a writing manner, and/or
       in a reading-back manner
     for swapping columns, and/or
     driven in a row-by-row manner by means of an external controller for all columns simultaneously, and/or
     in a column-by-column manner from the processor elements, and/or
     in a writing manner and/or
     in a reading manner
     for access to the memory matrix (optional)
     and/or for access to the sensor matrix (optional)
   with an analog unit (optional)
     for readout of the sensor matrix in a column-by-column manner, and/or
     for buffering one or several readout values (optional)
     for calculating differences between stored values (optional) and/or present pixel values from the sensor matrix (optional)
     for calculating a difference (optional)
       storage of the difference on a memory
       or direct forwarding of the difference
   a switch matrix for forwarding the difference (optional)
     with the possibility for reversing the polarity of the difference
   a circuit for sign processing (optional)
     for the non-inverted output, and/or
     for the inverted output, and/or
     for the zeroing of negative values
   with an analog-to-digital converter (optional)
   with a digital processing unit ALU (optional)
     for processing the digitized data, and/or
     for controlling the addressing
       of the multiplexer, and/or
       of the memory matrix
   with memories (optional)
     as a register and/or
     as a memory block
   programmable bus access (optional)

7. Implementation Alternatives

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

The inventive encoded audio signal may be stored on a digital storage medium may be transmitted on a transmission medium such as a wireless transmission medium or a wired transmission medium such as the internet.

Depending on specific implementation requirements, embodiments of the invention may be implemented in hardware or in software. Implementation may be effected while using a digital storage medium, for example, a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein.

The data stream or the sequence of signals may be configured, for example, to be transferred via a data communication link, for example, via the internet.

A further embodiment includes a processing means, for example, a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example, a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

REFERENCES

[1] Jens Döge, Christoph Hoppe, Peter Reichel, Nico Peter. Megapixel HDR Image Sensor SoC with Highly Parallel Mixed-Signal Processing. International Image Sensor Workshop (IISW), 2015.

[2] Leif Lindgren, Johan Melander, Robert Johansson, B Moller. A multiresolution 100-GOPS 4-Gpixels/s programmable smart vision sensor for multisense imaging. Solid-State Circuits, IEEE Journal of, 40(6):1350-1359, 2005.

The invention claimed is:

1. A readout arrangement for an image sensor,
wherein the readout arrangement is configured to receive from a plurality of column leads of the image sensor in parallel a plurality of image sensor analog signals describing in an analog manner brightness values detected by the image sensor, and
wherein the readout arrangement is configured to select which subset of a plurality of analog values represented by the image sensor analog signals or based on the image sensor analog signals is to be stored in an analog memory for further processing, and to cause storage of the selected analog values in the analog memory, or to store the selected analog values in the analog memory,
wherein the readout arrangement is configured to, based on an evaluation of the image sensor analog signals, decide which subset of a plurality of analog values represented by the image sensor analog signals or based on the image sensor analog signals is to be stored in the analog memory for further processing.

2. The readout arrangement according to claim 1,
wherein the readout arrangement is configured to detect if a course of an image sensor analog signal belonging to a respective image column comprises across a plurality of image rows a course that fulfils a specified condition, and
wherein the readout arrangement is configured to, in response to detecting that a course of an image sensor analog signal belonging to a respective image column comprises across a plurality of image rows a course that fulfills a specified condition, cause storage of analog values describing the course in the analog memory.

3. The readout arrangement according to claim 1,
wherein the readout arrangement is configured to perform analog preprocessing of the image sensor analog signals in order to acquire preprocessed signals, and
wherein the readout arrangement is configured to select analog values, which are represented by the preprocessed signals, based on the image sensor analog signals for storage in the analog memory.

4. The readout arrangement according to claim 1, wherein the readout arrangement is configured to, in response to an image sensor analog signal or a signal based on an image sensor analog signal passing a specified threshold value in a first direction and/or in a second direction, decide that an analog value represented by the respective image sensor analog signal or based on the respective image sensor analog signal is to be stored in the analog memory for further processing.

5. The readout arrangement according to claim 4, wherein the readout arrangement is configured to, upon passing the specified threshold value, additionally store digital information carrying information as to which row of the image sensor is being read out when passing the specified threshold value has been detected.

6. The readout arrangement according to claim 1, wherein the readout arrangement is configured to decide column-individually or separately for different columns or separately for different groups of columns whether an analog value represented by an image sensor analog signal of a respective column lead, or an analog value based on the image sensor analog signal of the respective column lead, is to be stored in the analog memory for further processing.

7. The readout arrangement according to claim 1, wherein the readout arrangement is configured to acquire configuration information that separately determines for different columns from which image rows analog values represented by the image sensor analog signals or analog values based on the image sensor analog signals are to be stored in the analog memory for further processing.

8. The readout arrangement according to claim 1, wherein the readout arrangement is configured to cause storage of the analog values represented by the image sensor analog signals or based on the image sensor analog signals without prior checking whether the analog values are to be acquired for further processing, and wherein the readout arrangement is configured to, if the readout arrangement determines that the analog value stored without prior checking is not to be stored for further processing, cause an overwrite of the analog values stored without prior checking.

9. The readout arrangement according to claim 1, wherein the readout arrangement is configured to successively store successive analog values represented by the image sensor analog signals or based on the image sensor analog signals in an analog memory region that is driven or configured as a ring buffer.

10. The readout arrangement according to claim 9, wherein the readout arrangement is configured to, in response to detecting that analog values stored in the ring buffer are to be stored for further processing, prevent overwriting.

11. The readout arrangement according to claim 10, wherein detecting that analog values stored in the ring buffer are to be stored for further processing is performed based on detecting a local or absolute maximum of a brightness value on the basis of an image sensor analog signal.

12. The readout arrangement according to claim 1, wherein the readout arrangement is configured to, in response to detecting that analog values are to be stored for further processing, store a fixed number of analog values for further processing, or wherein the readout arrangement is configured to, in response to detecting that analog values are to be stored for further processing, store depending on the analog values a variable number of analog values for further processing.

13. The readout arrangement according to claim 1, wherein the readout arrangement is configured to selectively store analog values in the analog memory that fulfil a specified condition.

14. The readout arrangement according to claim 1, wherein the readout arrangement is configured to store information describing which subset of the plurality of analog values represented by the image sensor analog signals or based on the image sensor analog signals was stored in the analog memory for further processing.

15. The readout arrangement according to claim 1, wherein the readout arrangement is configured to vary an assignment between an image column and columns of the analog memory in which analog values belonging to the image column are stored.

16. The readout arrangement according to claim 1, wherein the readout arrangement is configured to, upon storing in the analog memory, rearrange analog values, that are assigned to image points.

17. The readout arrangement according to claim 1, wherein the readout arrangement is configured to store the analog values into the analog memory such that signals read out from the analog memory and the image sensor analog signals are compatible with respect to a signal level.

18. The readout arrangement according to claim 1, wherein the readout arrangement is configured to perform analog arithmetic operations based on signals read out from the analog memory.

19. The readout arrangement according to claim 1, wherein the readout arrangement is configured to perform analog arithmetic operations in which image sensor analog signals and signals read out from the analog memory are combined.

20. An image sensor system comprising:
an image sensor;
a readout arrangement according to claim 1; and
an analog-to-digital converter; and
a digital processor;
wherein the analog-to-digital converter is configured to digitize analog values stored in the analog memory or analog values derived therefrom, and
wherein the digital processor is configured to analyze image information based on digital signals provided by the analog-to-digital converter.

21. The image sensor system according to claim 20, wherein the analog-to-digital converter is configured to digitize the analog values stored in the analog memory or analog values derived therefrom in a separate readout process downstream of a readout of the image sensor.

22. The image sensor system according to claim 20, wherein the digital processor is configured to, based on the digital signals provided by the analog-to-digital converter, detect a position of a line in an image detected by the image sensor.

23. The image sensor system according to claim 20, wherein the digital processor is configured to evaluate information describing which subset of the plurality of analog values represented by the image sensor analog signals or based on the image sensor analog signals was stored in the analog memory for further processing.

24. The image sensor system according to claim 20, wherein the image sensor system is configured to determine a position of a light line along a respective column of the image sensor for different columns of the image sensor.

25. The image sensor system according to claim 20, wherein the image sensor system is configured to selectively store analog values in the analog memory that are present upon a significant change of an image sensor analog signal or a signal based on an image sensor analog signal.

26. The image sensor system according to claim 25, wherein the image sensor system is configured to, based on the selectively stored analog values, perform an evaluation of a white light interferometry.

27. A method for reading out an image sensor,
wherein the method comprises parallelly receiving from a plurality of column leads of the image sensor a plurality of image sensor analog signals describing in an analog manner brightness values detected by the image sensor, and wherein the method comprises selecting which subset of a plurality of analog values represented by the image sensor analog signals or based on the image sensor analog signals is stored in an analog memory for further processing, wherein, based on an evaluation of the image sensor analog signals, it is decided which subset of a plurality of analog values represented by the image sensor analog signals or based on the image sensor analog signals is to be stored in an analog memory for further processing; and wherein the method comprises storing the selected analog values in the analog memory.

28. A readout arrangement for an image sensor,
wherein the readout arrangement is configured to receive from a plurality of column leads of the image sensor in parallel a plurality of image sensor analog signals describing in an analog manner brightness values detected by the image sensor, and wherein the readout arrangement is configured to vary an assignment between an image column and columns of an analog memory in which analog values belonging to the image column are stored so that analog values belonging to an image column are stored in different memory columns of the analog memory, and such that analog values describing a line running diagonally across the image sensor are stored in a rectangular memory region of the analog memory.

29. The readout arrangement according to claim 28, wherein the readout arrangement is configured to, upon storing in the analog memory, rearrange analog values assigned to image points.

* * * * *